United States Patent

Ohtsuka et al.

[11] Patent Number: 6,055,139
[45] Date of Patent: Apr. 25, 2000

[54] MAGNETIC RECORDING MEDIUM AND METHOD OF FORMING THE SAME AND MAGNETIC DISK DRIVE

[75] Inventors: Yoshinori Ohtsuka; Yoshifumi Mizoshita; Takao Koshikawa; Hiroshi Maeda, all of Kanagawa, Japan

[73] Assignee: Fujitsu Limited, Kawasaki, Japan

[21] Appl. No.: 08/762,207

[22] Filed: Dec. 9, 1996

[30] Foreign Application Priority Data

Dec. 14, 1995 [JP] Japan ..................................... 7-325320
Sep. 10, 1996 [JP] Japan ..................................... 8-239007

[51] Int. Cl.$^7$ ............................... G11B 5/74; G11B 23/00
[52] U.S. Cl. ............................................................ 360/131
[58] Field of Search ................................... 360/131, 135; 427/127, 131; 428/694 BM, 694 MM, 694 TM, 900

[56] References Cited

U.S. PATENT DOCUMENTS 5,568,331  10/1996  Akagi et al. ............................. 360/135
5,677,819  10/1997  Seko et al. ............................... 360/135

FOREIGN PATENT DOCUMENTS

| 59-27642 | 4/1984 | Japan . |
| 59-72644 | 4/1984 | Japan . |
| 2-201730 | 8/1990 | Japan . |
| 2218016 | 8/1990 | Japan . |
| 434718 | 2/1992 | Japan . |
| 5-205257 | 8/1993 | Japan . |
| 6180840 | 6/1994 | Japan . |

*Primary Examiner*—George J. Letscher
*Attorney, Agent, or Firm*—Greer, Burns & Crain Ltd.

[57] ABSTRACT

A magnetic recording medium having magnetic patterns into which servo information are written and a magnetic recording layer into which data are written comprises a nonmagnetic substrate, a magnetic recording layer formed on the substrate, and a hard magnetic layer contacted the magnetic recording layer within servo signal recording regions on the substrate and constituting servo patterns of film thicknesses of which are varied in the track length direction. Thereby, more precise reading of the servo signals by the magnetic head is assured and a surface of the magnetic recording medium can be flatted.

9 Claims, 22 Drawing Sheets t: FILM THICKNESS OF MAGNETIC RECORDING LAYER
N: NUMBER OF LAMINATED SERVO LAYER

OP1: output power from the magnetic recording layer
without the servo layer

OP2: output power from the servo layer
without the magnetic recording layer

→ : Direction of rotating of the magnetic disk

MAGNETIC RECORDING MEDIUM AND METHOD OF FORMING THE SAME AND MAGNETIC DISK DRIVE

BACKGROUND OF THE INVENTION

1. Field of the Invention

The present invention relates to a magnetic recording medium and a method of forming the same and a magnetic disk drive and, more particularly, a magnetic recording medium having magnetic patterns into which servo information (track position information) are written and a magnetic recording layer into which data are written and a method of forming the same and a magnetic disk drive which is equipped with the magnetic recording medium.

2. Description of the Prior Art

In order to enhance a magnetic recording density, there is a tendency to increase a track density of the magnetic recording medium (magnetic disk) in the field of the magnetic disk drive. Improvements in tracking accuracy of the magnetic head are indispensable for accomplishing the high track density. Various tracking servomechanisms such as servo surface servomechanism, sector servomechanism, buried servomechanism, or the like may be considered as a means for detecting the tracking position.

In these servomechanisms, servo signals written into the magnetic disk are read by means of the magnetic head, and a head actuator is controlled based on the servo signals to shift the magnetic head to a target track position.

As the magnetic recording medium having a structure for recording both the servo signals and data information, as set forth in Japanese Patent Application Publication (KOKAI) 2-218016, for instance, there has been proposed such a method that uneven bits to be read magnetically are provided on the surface of the magnetic recording medium, then magnetic fluxes generated from ends of the bits are detected as tracking signals, and then position of the magnetic head is controlled based on the tracking signals. The structure with the magnetic recording layer on the bits and the structure without the magnetic recording layer on the bits have been proposed.

However, the presence of the uneven surface of the magnetic recording medium prevents the magnetic head from being in a lower flying height state over the magnetic disk. Such uneven surface causes trouble if a high recording density should be achieved by decreasing the flying height of the magnetic head. Moreover, if the magnetic disk has an uneven surface, dusts are easily accumulated in concave portions on the uneven surface of the magnetic recording medium. On the other hand, in Japenese Patent Application Publications (KOKAIs) 59-72644 and 4-34718, there has been set forth that a magnetic recording medium having the structure wherein magnetic substance patterns (referred to as "servo patterns" hereinafter) for recording servo information therein are formed on the substrate, and then the nonmagnetic layer and the magnetic recording layer are formed on the servo patterns and the substrate in sequence.

In Japenese Patent Application Publication (KOKAI) 4-34718, there has been set forth that the servo patterns are to be formed by a lift-off method, thereby improving surface evenness of the magnetic recording layer.

However, according to the structures of the servo patterns set forth in these publications (KOKAIs), the servo patterns and the magnetic head are positioned at a good distance away since not only a gap due to the flying height of the magnetic head but also the nonmagnetic layer and the magnetic recording layer are present between the servo patterns and the magnetic head. For this reason, read error of the servo signals easily occurs because, with the longer distance between the servo patterns and the magnetic head, the signal magnetic fields generated from the servo patterns to the magnetic head is lessened.

If the lift-off method is utilized to form the servo patterns, flashes are prone to be formed around peripheries of the servo patterns. The occurence of flashes increases the likehood of a head crash of the magnetic head in the low flying height region. In order to achieve high track density, the precision of tracking the magnetic head has to be improved. For example, the phase servo system has been used to detect information with regard to the tracking position.

The phase servo system is that the servo patterns are arranged to change the phase of the reproduced servo signal according to position of the magnetic head in the track direction (circumferential direction).

In the prior art, in order to record such servo patterns on the surface of the magnetic recording medium, a following method has been employed. For instance, as shown in FIG. 1A, while the magnetic head 120 is being shifted in the width direction of the track 110 by the first pitch L1 having a length which can be divided into plural lengths (e.g., three to four lengths) in the width direction (diameter direction) of the track 110 and concurrently the magnetic head 120 is being shifted by the second pitch L2 in the circumferential direction, a plurality of magnetization inversion patterns are formed on the surface of the magnetic recording medium. The magnetization inversion patterns are utilized as the servo patterns 130. A width of magnetic pole of a recording inductive head of the magnetic head 120 is almost identical to the track width.

The precision of detecting the tracking (track alignment) information in the phase servo system becomes higher as the number of split in each track in the diameter direction is increased larger. Such precision also becomes higher as the servo patterns 130 are made more sharply.

However, the more the number of split in each track 110, the more the recording time of the servo patterns 110 per one sheet of the magnetic recording medium. Further, if the number of split in each track 110 is increased, the alignment precision of the magnetic head 120 is reduced in the high density track upon recording the servo patterns 130. Still further, as shown in FIG. 1B, because of leakage magnetic field generated from end portions of the magnetic pole of the magnetic head 120, bit bends 131 occur at the end of the servo pattern 130. Otherwise, because of recording bleeding, erase regions 132 occur at the end of the servo pattern 130. As a result, there is such a problem that the quality of servo information is debased.

Since small servo patterns per bit, as set forth in Patent Application Publication (KOKAI) 59-72644, are formed in plural numbers within one track, omissions of such patterns would be caused upon etching to form the servo patterns.

SUMMARY OF THE INVENTION

An object of the present invention is to provide a magnetic recording medium capable of ensuring more precise reading of servo signals by a magnetic head and also improving surface evenness of the magnetic recording medium, a method of manufacturing the same capable of improving surface evenness of the magnetic recording medium still further, and a magnetic disk drive which is equipped with the magnetic recording medium.

According to the present invention, since film thicknesses of the hard magnetic layer formed successively so as to contact the magnetic recording layer are varied in the track length direction within the servo signal recording region and the thicker portions of the hard magnetic layer are used as the servo patterns.

Consequently, because a distance between the servo patterns and the magnetic head can be reduced extremely, the servo signal magnetic fields read by the magnetic head are enhanced, and therefore read error can be prevented from being generated.

As the first structure of the magnetic recording medium wherein the film thickness of the hard magnetic layer is varied in the servo signal recording region, first, there is a structure wherein the servo layers made of hard magnetic substance are formed beneath the magnetic recording layer made of hard magnetic substance. In this event, the servo signals are written into the servo layers as well as the magnetic recording layer to thus increase intensity of the servo signal magnetic fields. Besides, the servo layer constitutes a plurality of servo patterns if patterned. When a surface of the magnetic recording medium opposing to the magnetic head is planalized by forming the nonmagnetic layer beneath the magnetic recording layer so as to surround the servo patterns, the magnetic head can be prevented previously from being crashed in a low flying height state.

As the second structure of the magnetic recording medium, there is a structure wherein the servo layers made of hardy magnetic substance are superposed on the magnetic recording layer made of hard magnetic substance. In this case, the servo signals are written into the servo layers as well as the magnetic recording layer to thus increase intensity of the magnetic fields caused by the servo signals. Further, the servo layer constitutes a plurality of servo patterns if patterned. If the nonmagnetic layer is formed on the magnetic recording layer so as to surround the servo patterns, the surface of the magnetic recording medium opposing to the magnetic head is able to be flat.

In the case that the servo layer and the magnetic recording layer are formed by the same substance, it has been confirmed experimentally that the tracking information magnetic field having the same magnitude as the data signal magnetic field can be derived if the film thickness of the servo layer is 2.5 or more times thicker than that of the magnetic recording layer. In other words, an amount of change in the film thickness of the hard magnetic layer in the direction of the track length may be 2.5 or more times larger than the film thickness of the magnetic recording layer.

If the servo patterns are aligned in plural rows within each track to have different phases and also are so formed in respective tracks that they are shifted to have different phases in the track length direction track by track, the tracking position information can be detected by detecting displacement in waveforms of the tracking information magnetic fields in the tracking length direction, which are caused due to phase difference.

In the present invention, as the method of forming such servo patterns, after the servo patterns are formed by the lift-off method, the surface of the resultant structure is planalized by polishing or etching or burnishing. Therefore, surface evenness of the magnetic recording medium can be maintained, and generation of head crash can be prevented beforehand.

As the different method of forming such servo patterns, after the concave portions are formed on the nonmagnetic layer in the servo pattern forming regions, the servo layers made of hard magnetic substance and the planalization film are then formed on the nonmagnetic layer sequentially, and the servo layers and the planalization film are then etched back, so that the servo patterns are formed with remaining the servo layers only within the concave portions. According to this method, no flash occurs and surface evenness of the servo patterns and the nonmagnetic layer is in no degree damaged.

As the still different method of forming such servo patterns, the hard magnetic layer is formed, then the hard magnetic layers located in the servo pattern not-forming regions are changed into the nonmagnetic layers by ion-implanting nonmagnetic elements into the servo pattern not-forming regions, and then the remaining hard magnetic layers are used as the servo patterns. As a result, surface evenness of the servo patterns and their neighboring areas is in no ways damaged.

In case the structure is adopted wherein the servo patterns are stacked on the magnetic recording layer, after the hard magnetic layers are formed on the substrate, the hard magnetic layers in the servo pattern not-forming regions are thinned by etching, and then the nonmagnetic layer is stacked in the etched regions. Consequently, if the remaining thick hard magnetic layers being not subjected to etching are employed as the servo patterns, the nonmagnetic layers having the same thickness as that of the servo pattern are formed around respective servo patterns. Therefore, surface evenness of the servo patterns and their neighboring areas can be assured. If the hard magnetic layer in data writing regions are thinned and such thin-layered hard magnetic layer are utilized as the magnetic recording layer, the servo patterns and the magnetic recording layer may be formed at a time. Therefore, man-hours required for film forming in the magnetic recording medium can be reduced.

Another object of the present invention is to provide a magnetic recording medium on which servo patterns can be formed with high precision to thus improve the precision of detecting the position, a method of manufacturing the same and a magnetic recording apparatus.

According to another aspect of the present invention, since linear or curved servo patterns are formed as physical patterns on the magnetic recording medium to cross over a plurality of tracks obliquely, neither erase region nor bit bend occur upon forming the servo patterns unlike the prior art, thereby improving the precision of detecting the position. In this event, since linear or curved servo patterns are arranged at an oblique angle, they are magnetically equivalent to the conventional servo patterns.

Such conventional servo patterns are recorded in one track only on a magnetic basis while being shifted by predetermined pitches in both the track width direction and the track length direction respectively.

The servo patterns of the present invention can be realized with the use of change in film thickness of the magnetic layer, change in unevenness of the magnetic layer, and partial use of the magnetic layer. By continuously applying the magnetic field of the certain intensity from the outside to a plurality of such servo patterns along the certain direction, servo information can be written into respective servo patterns. Servo information can be derived from change in the magnetic field.

In this manner, linear or curved servo patterns crossing over a plurality of tracks obliquely are simple, and therefore omissions of patterns are difficult to occur rather than the case servo patterns which are obtained by dividing such servo patterns into plural parts are arranged. Further, such servo patterns can be formed by making use of resist patterns. The resist patterns can be formed via exposure step using the exposure mask or laser beam irradiation.

In case latent images of the servo patterns are formed on the resist by using the exposure mask, exposure is effected using one sheet of exposure mask while the substrate for the magnetic recording medium being rotated stepwise. In this case, provided that partial exposure of the resist performed every rotation step of the substrate is repeated, exposure process can be facilitated. Alternatively, alignment or focusing of the exposure mask may be effected every time when rotation of the substrate is stopped.

Meanwhile, in case the resist is exposed by irradiating the laser beam, exposure process can be accelerated when exposure is conducted while the substrate on which the servo patterns are to be formed being rotated stepwise or continuously.

Moreover, if the servo patterns are formed in the servo regions by etching the magnetic layer by the laser beam, servo patterns can be formed with good precision without exposure and development process for the resist.

DESCRIPTION OF THE PREFERRED EMBODIMENTS

There will be explained preferred embodiments of the present invention hereinafter with reference to accompanying drawings.

First Embodiment

Figure 2:
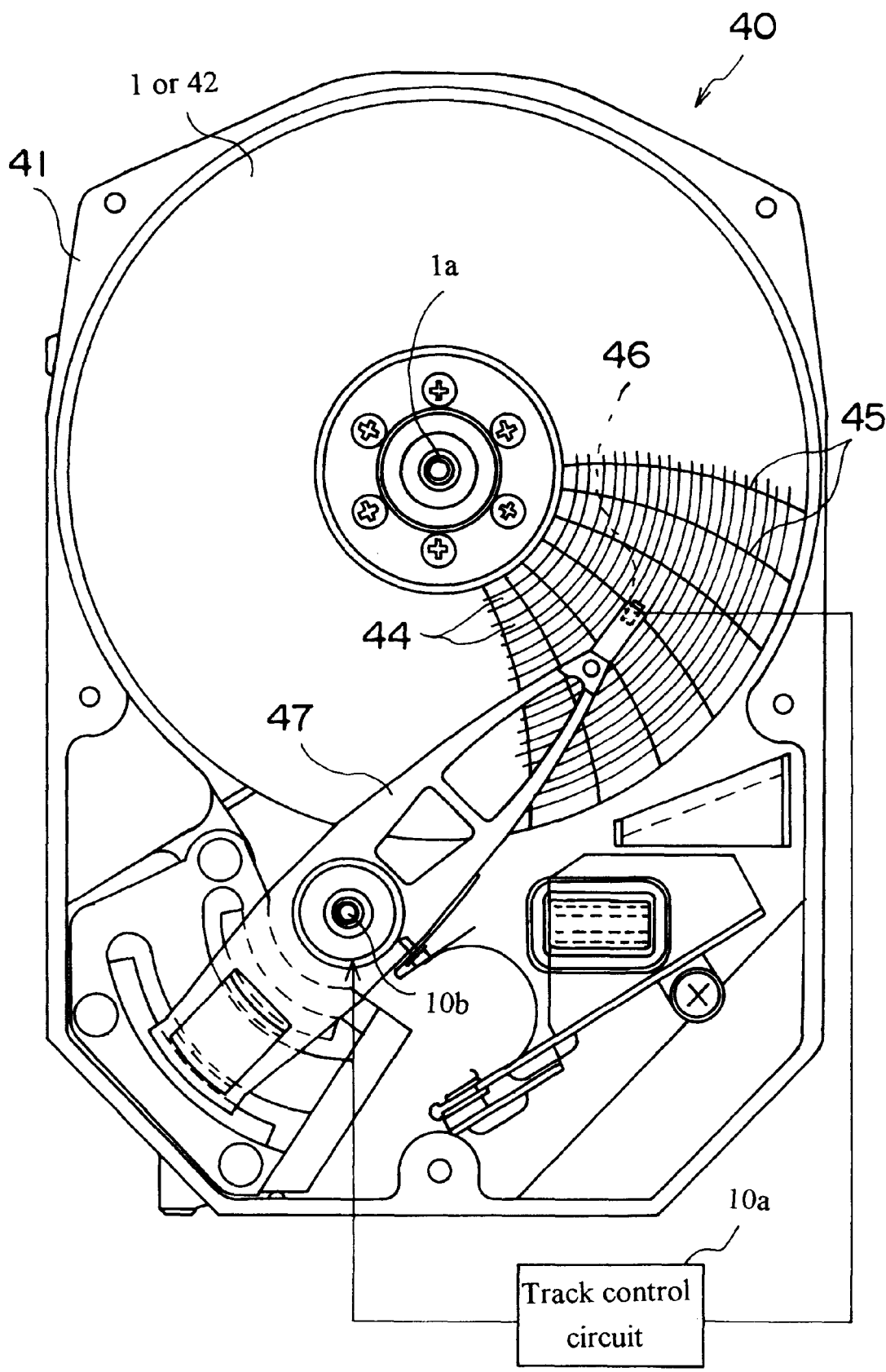
FIG. 2 is a plan view showing an example of a magnetic disk drive having a magnetic disk according to a first embodiment of the present invention.

FIG. 2 is a plan view showing the inside of the magnetic disk drive having the magnetic disk (magnetic recording medium) according to an embodiment of the present invention.

In a housing 41 of a magnetic disk drive 40 shown in FIG. 2, a circular disk type magnetic disk 1 or 42 is housed. A center of the magnetic disk 1 or 42 is secured to a rotation shaft 1a of a spindle motor.

On a surface of a magnetic recording layer of the magnetic disk 1 or 42, a large number of tracks 44 are formed to be arranged in the radial direction starting from the rotation center. Respective tracks 44 are formed to take annular regions which surround a periphery of the rotation center. Furthermore, on the surface of the magnetic recording layer, servo regions 45 extending from the rotation center to the outside in the radial direction are arranged in plural numbers in the peripheral direction. Although the tracks 44 and the servo regions 45 are illustrated in FIG. 2 for easy understanding of the present invention, they do not actually appear on the surface of the magnetic disk 1 or 42.

A slider 46 equipped with the magnetic head is secured to the top end of a head arm 47 and then positioned on the magnetic disk 1 or 42. Position of the slider 46 can be changed on the magnetic disk 42 according to the swing of the head arm 47. The head arm 47 is secured to a rotation shaft 10b of a step motor at its almost center portion. The head arm 47 is moved along with the rotation shaft 10b which is rotated by a signal supplied from a track control circuit 10a. In compliance with phase difference in the tracking servo patterns in the servo regions 45, the track control circuit 10a may recognize the track position lying under the magnetic head.

Second Embodiment

Figure 3:
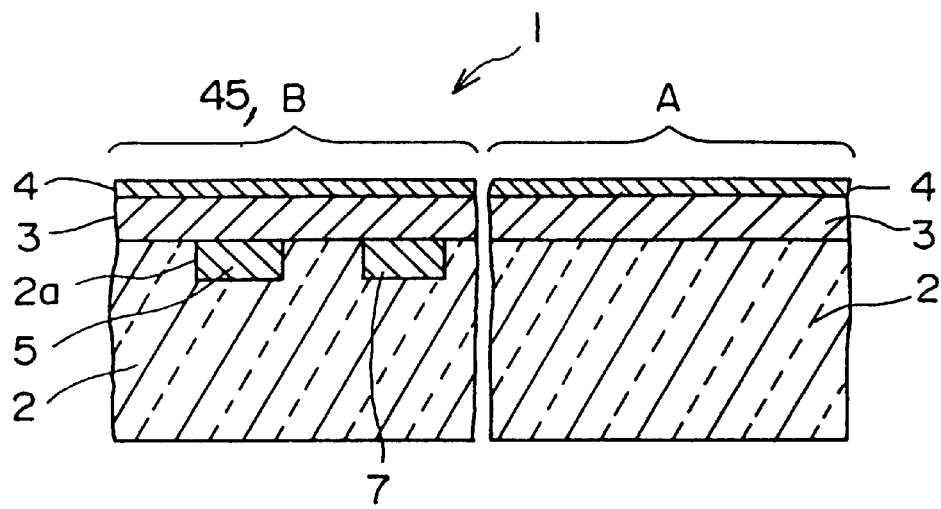
FIG. 3 is a fragmental sectional view showing a magnetic recording medium according to a second embodiment of the present invention.
Figure 4:
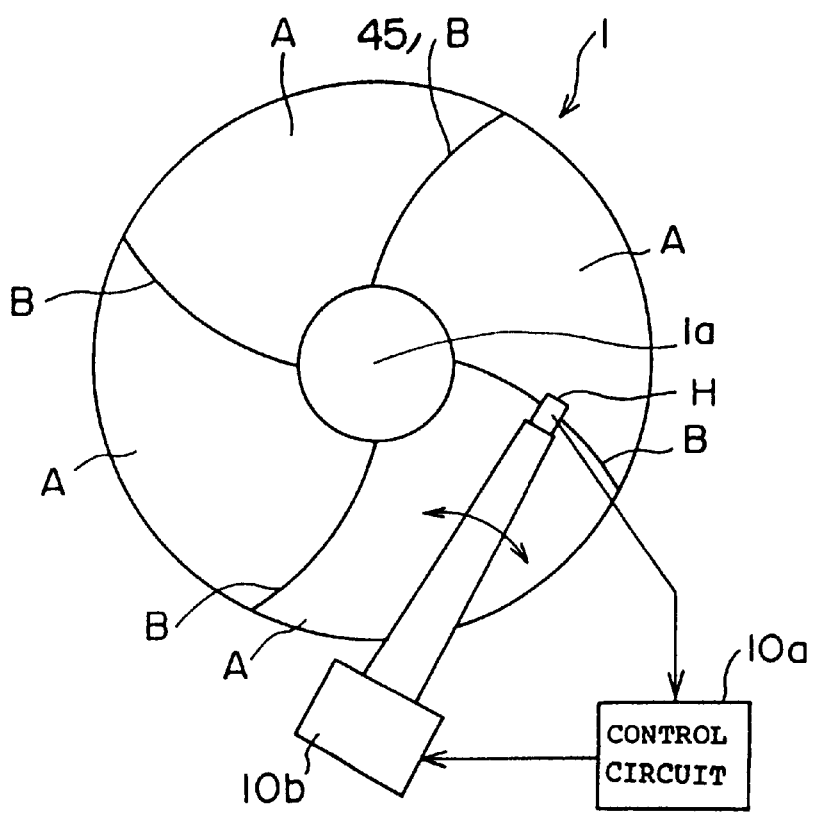
FIG. 4 is a plan view showing the magnetic recording medium according to the second embodiment of the present invention in FIG. 3.

FIG. 3 is a fragmental sectional view showing a magnetic recording medium according to a second embodiment of the present invention. FIG. 4 is a plan view showing the magnetic recording medium according to the second embodiment of the present invention in FIG. 3.

Referring to FIG. 3, a magnetic recording medium 1 comprises a nonmagnetic substrate 2 made of an aluminum wafer covered by NiP, a silicon wafer, or a glass wafer, a magnetic recording layer 3 made of a first hard magnetic substance such as CoCr, CoCrPt, CoCrTa, or CoNiCr formed on the nonmagnetic substrate 2, and a protection layer 4 for covering the magnetic recording layer 3.

The magnetic recording medium 1 assumes the shape of the circular disk in which a shaft hole 1a is formed at the center thereof, and comprises data signal recording regions A and servo signal recording regions B, as shown in FIG. 4. The servo signal recording regions B is formed as the circular arc shape, as shown in FIG. 4, so as to correspond to the swing orbit of the magnetic head H. This is because such circular arc shape may reduce a difference in yaw angle caused between an inner periphery and an outer periphery of the magnetic recording medium 1 when the magnetic head H is being swung by a rotary actuator 10b. If the difference in yaw angle is increased, variation in the read signals read by the magnetic head H will be brought forth.

In the servo signal recording regions B of the surface of the nonmagnetic substrate 2, as shown in FIG. 3, a plurality of concave portions 2a are formed at a distance to assume the servo pattern shape, and servo layers 5 made of a second hard magnetic substance such as CoCr, CoCrPt, CoCrTa or CoNiCr are buried in these concave portions 2a. One servo layer 5 in one concave portion 2a and the magnetic recording layer 3 formed on the servo layer 5 constitute substantially one servo pattern 5p. Since the servo layers 5 contact the magnetic recording layer 3 in the servo signal recording regions B, servo information to be written into the servo layers 5 are also written into the magnetic recording layer 3 on the servo layers 5. Consequently, no data is recorded in the magnetic recording layer 3 in the servo signal recording regions B.

Either the same substance as the first hard magnetic substance constituting the magnetic recording layer 3 or different substance from the first hard magnetic substance may be used as the second hard magnetic substance constituting the servo layers 5.

Figure 5A:
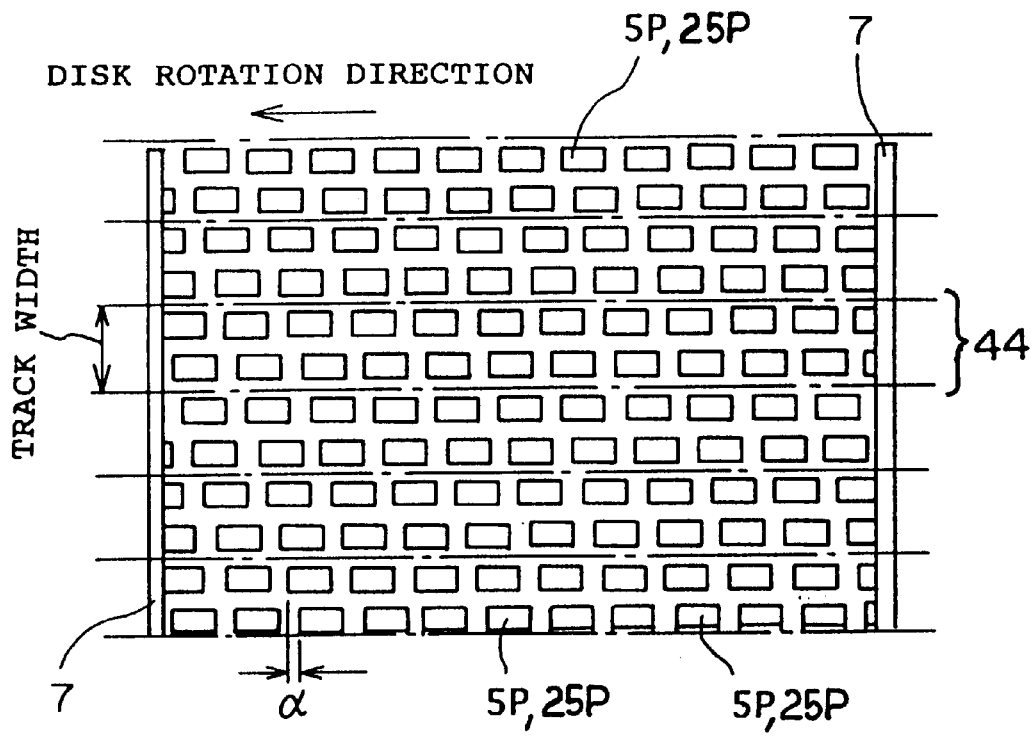
FIG. 5A is a fragmental plan view showing arrangement of servo patterns in the magnetic recording medium according to the second embodiment of the present invention in FIG. 3.

In the servo signal recording regions B, as shown in FIGS. 3 and 5A, stripe shape clock signal patterns 7 are buried on the surface of the nonmagnetic substrate 2. A distance between two clock signal patterns 7 serves as one clock signal interval, and a plurality of servo patterns 5p are arranged between two clock signal patterns 7 to assume substantially a matrix form.

Figure 5B:
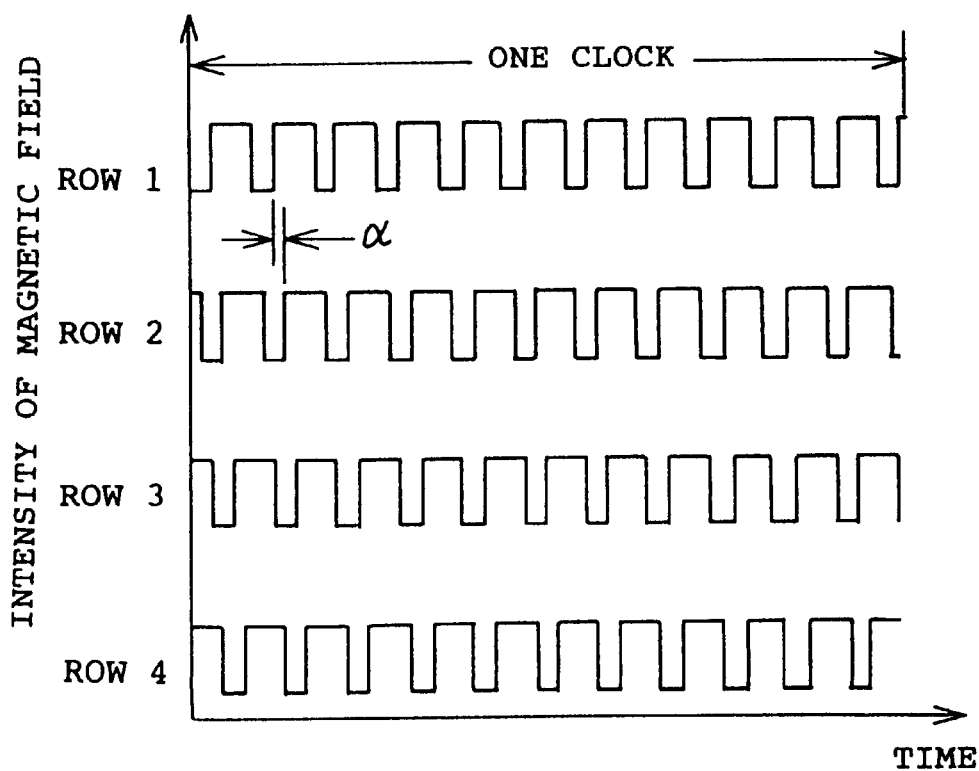
FIG. 5B is a waveform chart showing an example of tracking signals obtained by reading the servo patterns in FIG. 5A by a magnetic head.

In other words, a plurality of servo patterns 5p are aligned at a certain distance in the circumferential direction, i.e., the track length direction of the magnetic recording medium 1, but they are arranged in the diameter direction of the magnetic recording medium 1 to shift by a fixed amount α in every track length direction. If a row pattern is defined by a plurality of servo layers 5 which are aligned in the track length direction, a phase difference α appears, as shown in FIG. 5B, between signal magnetic field waveforms generated from two adjacent row patterns.

In FIG. 5A, a size of the servo pattern 5p is so decided that two rows of the servo patterns 5p can be arranged in one track width.

By detecting such phase difference α between the servo patterns 5p by the magnetic head, a relative positional relationship between the track position in the magnetic recording medium 1 and the magnetic head H can be detected. Accordingly, upon receiving the read signal from the magnetic head H, a control circuit 10 may shift the magnetic head H to a target position via an actuator 10b.

Next, it will be explained hereinafter how to write tracking information into the servo patterns 5p.

Figure 6A:
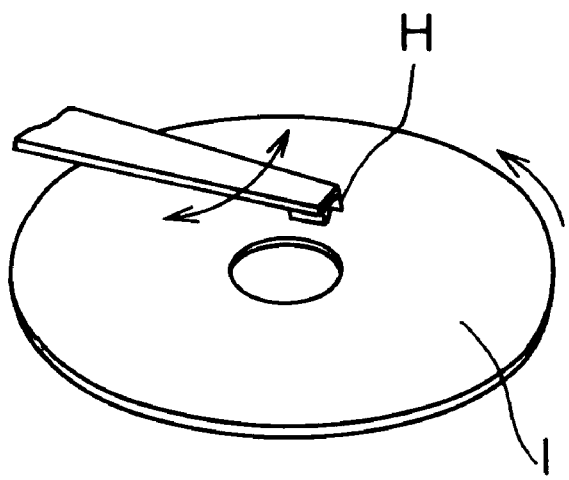
FIGS. 6A and 6B are schematic perspective views showing respectively methods of writing the tracking signals into the magnetic recording medium according to the second embodiment of the present invention.
Figure 6B:
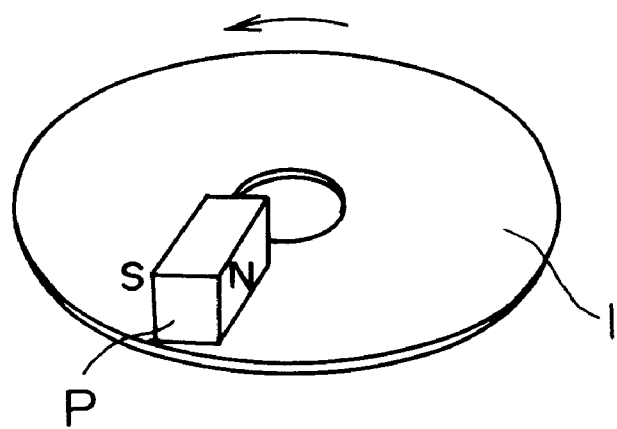

Writing of tracking information may be carried out by means of either the magnetic head H shown in FIG. 6A, or the permanent magnet P shown in FIG. 6B.

As shown in FIG. 6A, in the case of writing the tracking information by the magnetic head H, under the condition where the magnetic recording medium 1 of the circular disk type is being rotated, the desired servo layers 5 and the magnetic recording layer 3 formed around the desired servo layers 5 are magnetized in the circumferential direction (i.e., track length direction) by a DC magnetic field generated from the magnetic head H to have the same magnetization direction. It is preferable that, in writing the servo signal into the servo layers 5, a recording gap length Lg for the magnetic head H is longer than that used when writing data into the magnetic recording layer 3 since a strong magnetic field can be generated.

On the other hand, after an S pole and an N pole of the permanent magnet P are arranged along the circumferential direction, as shown in FIG. 6B, and then the magnetic recording medium 1 is rotated under such condition, the desired servo patterns 5p and the magnetic recording layer 3 around the servo patterns 5p are magnetized to have the same magnetization direction.

According to either of the above methods of writing tracking information, both the servo patterns 5p and the clock signal patterns 7 are magnetized in the same direction along the track length direction. Even if the data signal recording regions A are also magnetized simultaneously when the tracking information are written, such tracking information written into the data signal recording regions A may be erased by writing data thereinto.

Figure 7A:
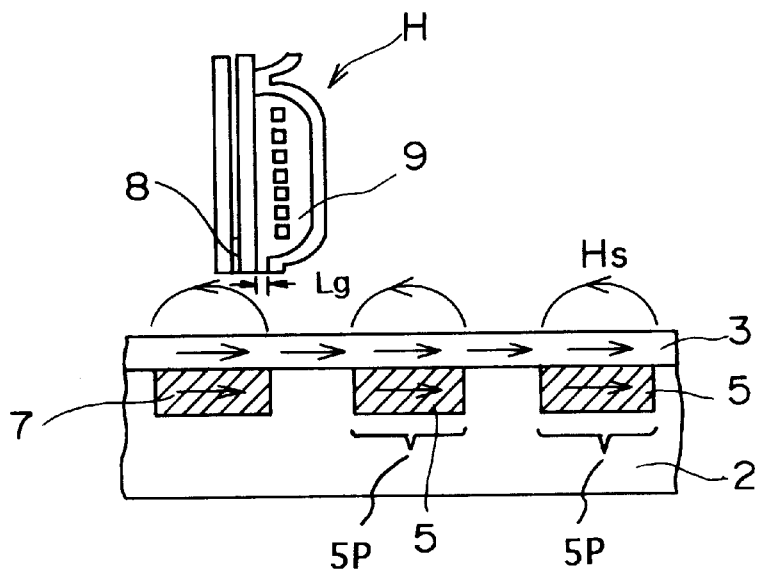
FIG. 7A is a sectional view showing a method of reading the tracking signals from the magnetic recording medium according to the second embodiment of the present invention.

The tracking information written as stated above are read via the magnetic head H having a magnetoresistance device 8 or inductive device 9, as shown in FIG. 7A. In this case, since a substantial thickness of the servo patterns 5p is given by a sum of film thicknesses of the servo layer 5 and the magnetic recording layer 3, leakage servo magnetic fields Hs leaked from the servo patterns 5p are increased in comparison with the case where the servo layer 5 and the magnetic recording layer 3 are formed at a distance.

In addition, since the servo patterns 5p are formed on the same plane as the magnetic recording layer 3, as shown in FIG. 7A, a distance between the magnetic head H and the servo patterns 5p becomes substantially identical to a distance between the magnetic head H and the magnetic recording layer 3. Therefore, servo magnetic field input into the magnetic head H is enhanced and the tracking information are able to be read more reliably.

In turn, an experimental result obtained by examining a relationship between the tracking signal output read by the magnetic head H and the film thickness of the servo patterns 5p will be explained.

While running the servo patterns 5p on the track under the reproducing magnetic head H, as shown in FIG. 7A, the tracking information have been read to examine the relationship between the tracking signal output and the film thickness of the servo patterns 5p. Consequently, the result shown in FIG. 7B has been derived.

Figure 7B:
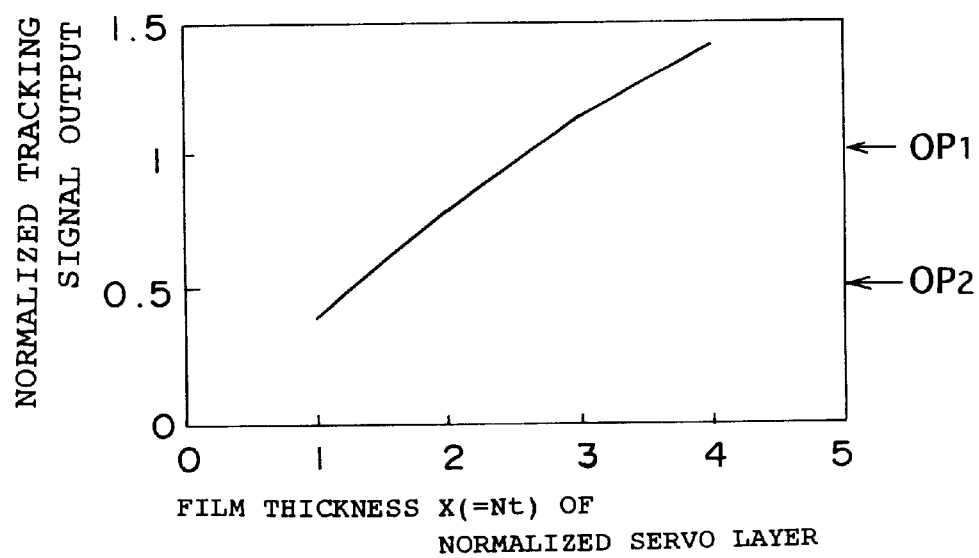
FIG. 7B is a characteristic view showing a relationship between the tracking signal and a film thickness of the servo patterns in FIG. 7A.

In FIG. 7B, an ordinate denotes tracking signal values which are normalized by setting data signal output obtained from the magnetic recording layer 3 formed in the data signal recording region A to "1". In addition, if the film thickness of the magnetic recording layer 3 is assumed as "1" and then the number of laminated layer of the servo layer 5 is set to N, the film thickness X of the servo layer 5 may be given by X=Nt (where t is a film thickness of the magnetic recording layer).

In FIG. 7B, with increase in the number of layer in the servo layer 5, the tracking signal is also increased. The tracking signal output having the same magnitude as the data signal output can be obtained if the film thickness X of the servo layer 5 is about 2.5 times that of the magnetic recording layer 3. In case concave bits are provided on the magnetic recording layer 3 without the servo layer 5, the tracking signal output derived from these bits becomes "0.5".

As evident from the above, the fact that the adjacent servo layers 5 constituting the servo patterns 5p are formed at a distance would be given as the reason why the servo signal output does not exceed the data signal output unless the film thickness of the servo layer 5 becomes 2.5 or more times thicker than that of the magnetic recording layer 3.

Subsequently, methods of forming the servo patterns 5p on the magnetic recording medium 1 as mentioned above will be explained.

FIRST EXAMPLE

Figure 8A:
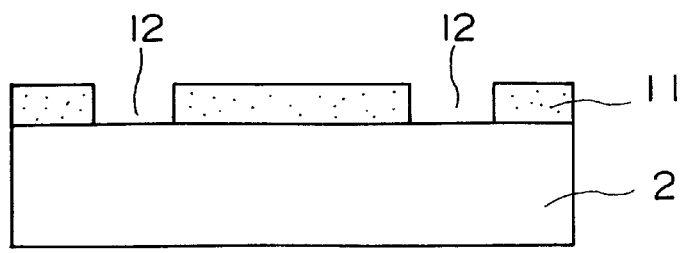
FIGS. 8A to 8E are sectional views illustrating a first method of manufacturing the magnetic recording medium according to the second embodiment of the present invention.

First, as shown in FIG. 8A, a resist 11 is coated on the nonmagnetic substrate 2, and then exposed and developed to form windows 12 in corresponding servo pattern forming regions within the servo signal recording regions B.

Figure 8B:
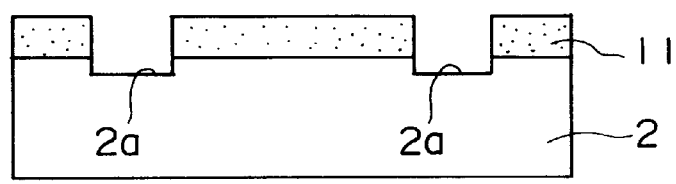

Thereafter, as shown in FIG. 8B, areas of the nonmagnetic substrate 2 exposed from the windows 12 of the resist 11 are etched to form concave portions 2a therein. Ion milling, sputtering etching, chemical etching, etc. may be used as the etching method. However, if a physical etching method (PVD method) such as ion milling is used, there is a possibility that flashes are formed on peripheries of the concave portions 2a. Therefore, it is mandatory to keep an appropriate ion irradiation angle to prevent such flashes.

If the silicon wafer is used as the nonmagnetic substrate 2, generation of such flashes can be prevented because reactive ion etching can be applied to the silicon wafer.

Figure 8C:
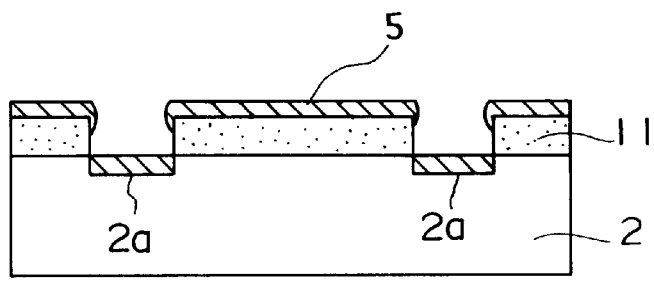

Next, as shown in FIG. 8C, the servo layer 5 is formed on an entire surface of the resultant structure by sputtering to be 5 to 250 nm thick. Subsequently, the resist 11 is peeled off by solvent to thus leave the servo layers 5 only in the concave portions 2a on the nonmagnetic substrate 2.

Figure 8D:
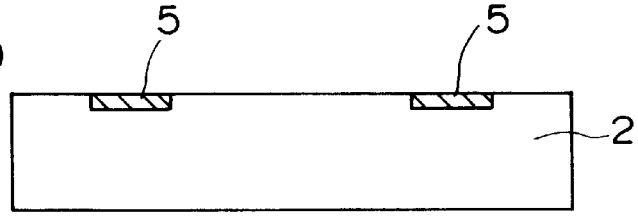

Then, as shown in FIG. 8D, the nonmagnetic substrate 2 and the servo layer 5 are planalized by means of mechanical polishing, ion milling, or sputtering. Since a recording surface of the magnetic recording medium 1 being faced to the magnetic head is planalized by this planalization process, there is no possibility that the magnetic head is lifted out of the recording face or the magnetic head which is sliding over the recording face is broken down by the projection.

Figure 8E:
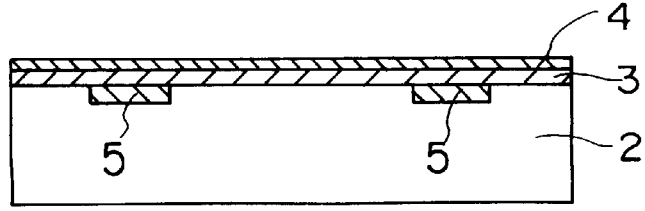

After such planalization process, as shown in FIG. 8E, the magnetic recording layer 3 formed of CoCrPt and covering the servo layer 5 and the nonmagnetic substrate 2 are formed by sputtering to have a thickness of 5 to 100 nm, and then the protection film 4 is formed thereon, thus completing the magnetic recording medium having the structure shown in FIG. 3A.

SECOND EXAMPLE

Figure 9A:
FIGS. 9A to 9D are sectional views illustrating a second method of manufacturing the magnetic recording medium according to the second embodiment of the present invention.

First, as shown in FIG. 9A, the concave portions 2a are formed on the nonmagnetic substrate 2 by the method similar to the first example.

Figure 9B:
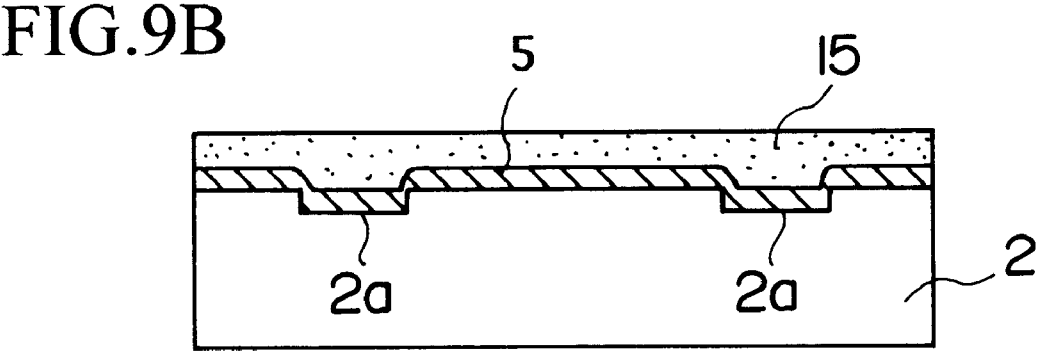

Next, as shown in FIG. 9B, the servo layer 5 made of CoCrPt is formed by sputtering on the nonmagnetic substrate 2 and within the concave portions 2a to be 5 to 250 nm thick, and in turn the photoresist 15 is coated on the servo layer 5.

Figure 9C:
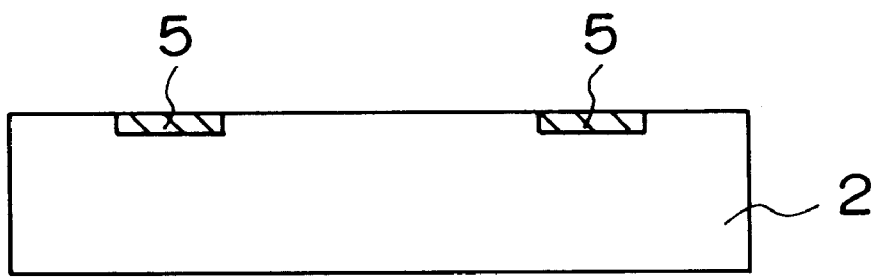

After this process, as shown in FIG. 9C, if the photoresist 15 and the servo layer 5 are etched by virtue of ion milling, sputtering etching, or the like, the servo layers 5 remain only in the concave portions 2a when the surface of the nonmagnetic substrate 2 is exposed.

In this event, mechanical polishing, or the like is not required since upper surfaces of the servo layers 5 in the concave portions 2a and the upper surface of the nonmagnetic substrate 2 are planalized.

Figure 9D:
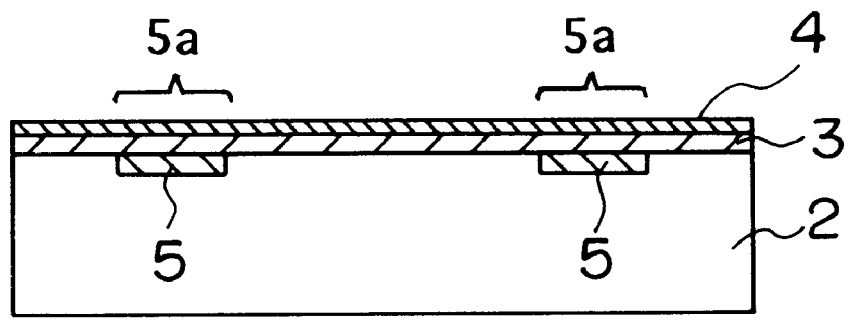

In the next, as shown in FIG. 9D, the magnetic recording layer 3 formed of CoCrPt is formed on the servo layer 5 and the nonmagnetic substrate 2 by sputtering to have a thickness of 5 to 100 nm. In addition, the protection film 4 is formed on the magnetic recording layer 3. The servo patterns 5p are formed by both the servo layers 5 remaining in the concave portions 2a and the magnetic recording layer 3 on the servo layers 5.

THIRD EXAMPLE

Although the servo patterns 5a formed according to the above manufacturing steps in the first example and the second example aforementioned are buried in the concave portions 2a formed on the surface of the nonmagnetic substrate 2, servo patterns and a nonmagnetic layer may be formed on the nonmagnetic substrate 2 according to manufacturing steps explained hereinbelow.

Figure 10A:
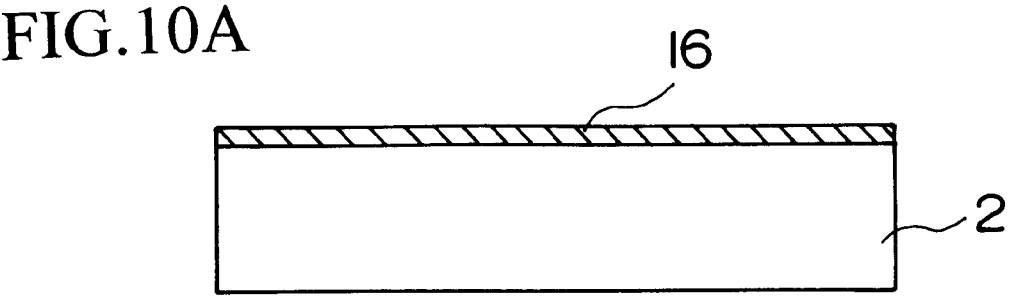
FIGS. 10A to 10D are sectional views illustrating a third method of manufacturing the magnetic recording medium according to the second embodiment of the present invention.

First, as shown in FIG. 10A, a hard magnetic layer 16 made of CoCrPt is formed on the nonmagnetic substrate 2 to be 5 to 250 nm thick.

Figure 10B:
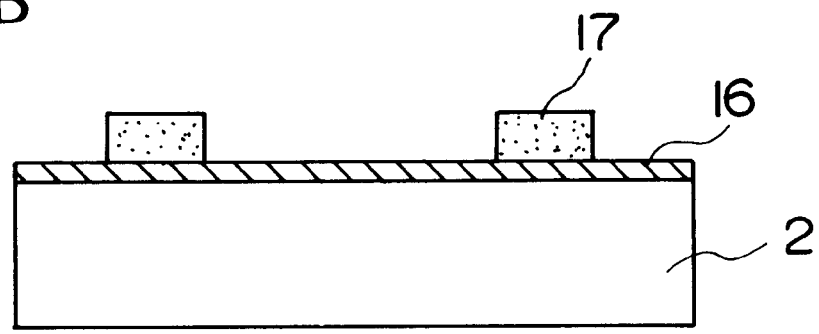

Then, as shown in FIG. 10B, a resist 17 is applied on the hard magnetic layer 16, and then exposed and developed so as to expose the hard magnetic layer 16 formed in regions except for servo pattern forming regions.

Figure 10C:
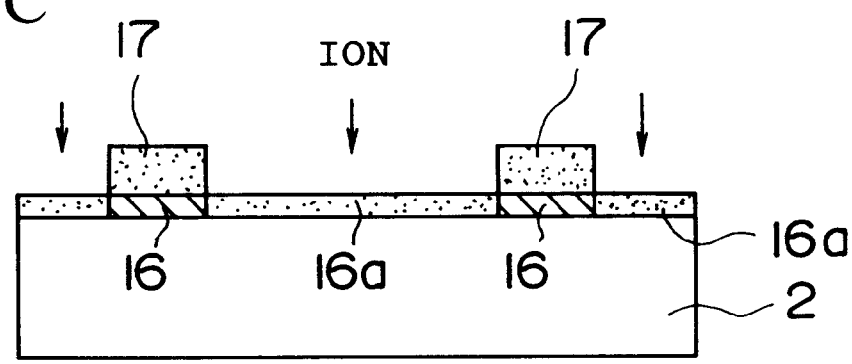

Subsequently, as shown in FIG. 10C, when chromium (Cr) is ion-implanted into the hard magnetic layers 16 within the regions not covered by the resist 17, such hard magnetic layers 16 are changed into nonmagnetic layers 16a since the hard magnetic layers 16 formed within the ion implantation regions become a Cr-rich state and also become a better amorphous state. The hard magnetic layers 16 beneath the resist 17 and remaining in the servo pattern forming regions are used as the servo patterns 5p.

Since unevenness is not caused by ion-implantation on the surface of the hard magnetic layers 16, planarization process can be omitted.

Figure 10D:
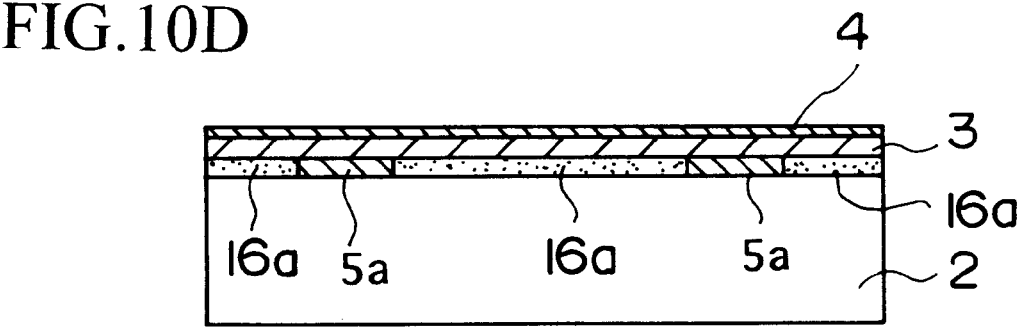

As shown in FIG. 10D, after the resist 17 is removed, the magnetic recording layer 3 made of 5 to 100 nm thick CoCrPt is formed by sputtering to cover the servo patterns 5a and the nonmagnetic layers 16a. Furthermore, the protection film 4 is formed on the magnetic recording layer 3, thereby finishing the magnetic recording medium.

In this structure, a plurality of servo patterns 5p directly contact the magnetic recording layer 3.

It would be understood that, in the second embodiment of the present invention, the nonmagnetic layer may be formed on the surface of the substrate and the concave portions may be provided on the nonmagnetic layer.

Third Embodiment

Although the magnetic recording layer has been formed on the servo layers in the second embodiment, conversely the servo layers may be formed on the magnetic recording layer, which will be explained as a third Embodiment of the present invention hereinbelow.

Figure 11:
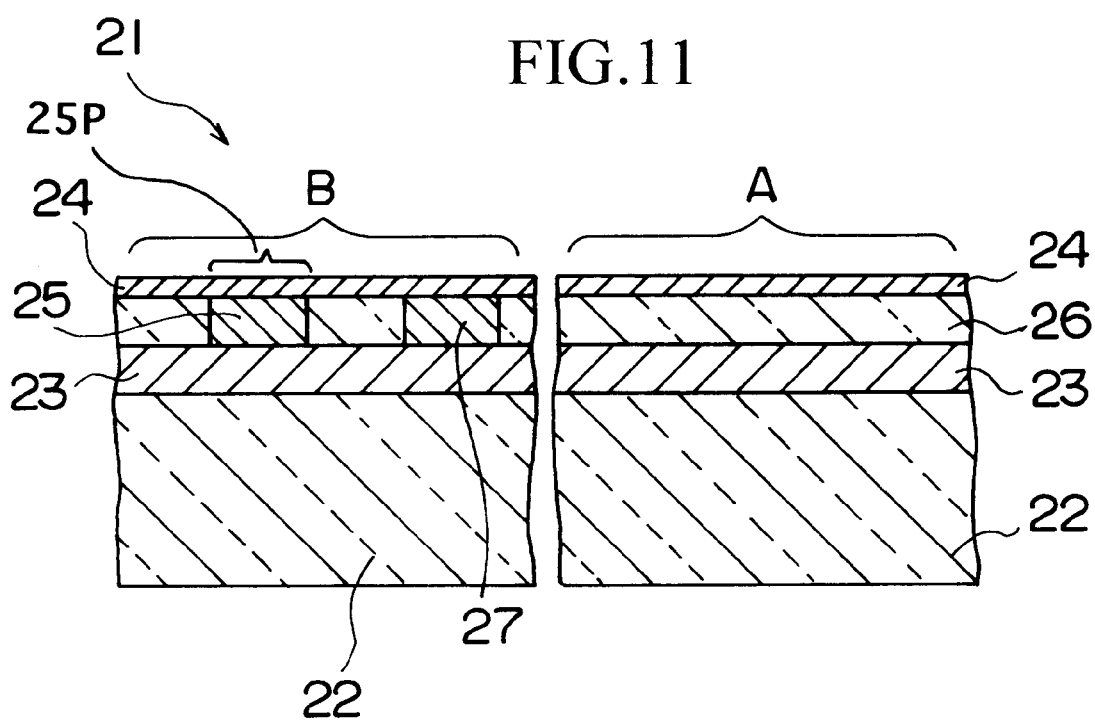
FIG. 11 is a fragmental sectional view showing a magnetic recording medium according to a third Embodiment of the present invention.

FIG. 11 is a fragmental sectional view showing a magnetic recording medium according to the third Embodiment of the present invention. A plan view of the magnetic recording medium is not shown because it is similar to that shown in FIG. 4.

Referring to FIG. 11, a magnetic recording medium 21 comprises a nonmagnetic substrate 22 made of glass wafer, silicon wafer, aluminum wafer covered by NiP, or the like, a magnetic recording layer 23 made of CoCr, CoCrPt, CoCrTa, CoNiCr, or the like formed on the nonmagnetic substrate 22, a nonmagnetic layer 26 made of Cr, Ti, W, $SiO_2$, or the like and covering the magnetic recording layer 23, a plurality of servo layers 25 made of CoCr, CoCrPt, CoCrTa, CoNiCr, or the like and surrounded by the nonmagnetic layer 26 on the magnetic recording layer 23, and a protection layer 24 for covering the magnetic recording layer 3. Servo patterns 25p are composed of a plurality of separated servo layers 25 and the magnetic recording layer 23 formed on the servo layers 25.

The magnetic recording medium 21 has a circular disk shape which has been used in the second embodiment. Like FIG. 4, clock signal patterns 27 are formed in the servo signal recording regions B and the servo patterns 25p are arranged between two clock signal patterns 27 in a similar manner to those in the second embodiment.

The same method as that in the second embodiment may be used to write tracking information into such servo patterns 25p. The tracking information written into the servo patterns 25p are read via the magnetic head.

In this case, the magnetic head H is able to read magnetic fields generated from the servo patterns 25p as the tracking information. Besides, since each servo pattern 25p is formed of the servo layer 25 and the magnetic recording layer 23, the tracking signal magnetic fields are increased rather than that generated by conventional servo patterns which are isolated completely.

Furthermore, since the nonmagnetic layer 26 is buried around the servo patterns 25p, a distance between the servo patterns 25p and the magnetic head H can be given by a sum of a flying height of the magnetic head H and a film thickness of the protection layer 24. As the result, the servo magnetic fields being input into the magnetic head are enhanced to ensure reading of the tracking information.

In the magnetic recording medium 21 according to the third Embodiment, if the servo patterns 25p are formed excessively thick, the neighboring nonmagnetic layer 26 also becomes thick. Consequently, a distance between the magnetic recording layer 23 and the magnetic head H becomes too long. It is therefore preferable that, if both the servo layer 25 and the magnetic recording layer 23 are formed by the same material, a film thickness of the servo layer 25 should be set about 2.5 times thicker than that of the magnetic recording layer 23 based on the experimental result in FIG. 7B.

Because the nonmagnetic layer 26 is also buried around the servo layers 25 in the third Embodiment, evenness of the recording face of the magnetic recording medium 21 can be achieved sufficiently.

Likewise, in the third Embodiment, no data is recorded in the servo signal recording regions B shown in FIG. 4.

A method of forming servo patterns of the above magnetic recording medium 21 will be explained to take examples hereinbelow.

FIRST EXAMPLE

Figure 12A:
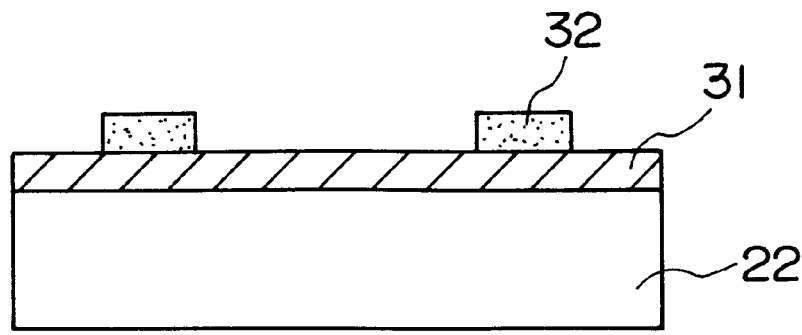
FIGS. 12A to 12D are sectional views illustrating a first method of manufacturing the magnetic recording medium according to the third embodiment of the present invention.

First, as shown in FIG. 12A, a hard magnetic layer 31 made of CoCrPt is formed by sputtering on the nonmagnetic substrate 22 to be 5 to 250 nm in thickness. Subsequently, a resist 32 is coated on the hard magnetic layer 31, and then exposed and developed to the hard magnetic layer 31 in the regions except for the servo pattern forming regions.

Figure 12B:
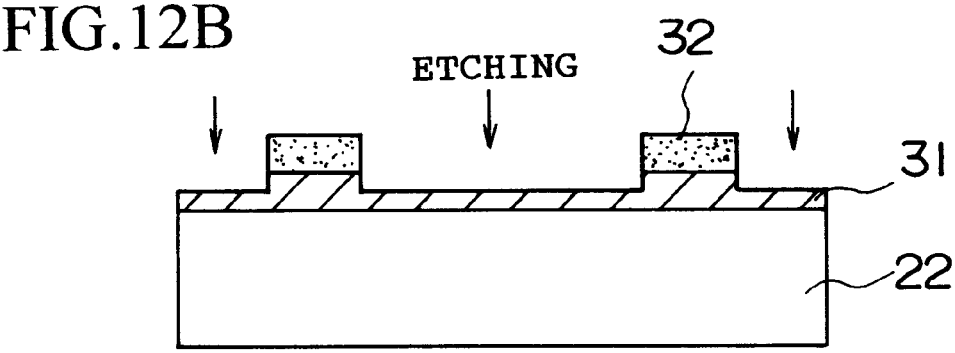

Then, as shown in FIG. 12B, the hard magnetic layer 31 not covered by the resist 32 is thinned by etching to be 5 to 100 nm in thickness. Thereby, a film thickness of the hard magnetic layer 31 remaining in the tracking pattern forming regions becomes thicker than that in other regions. The thick hard magnetic layer 31 is used as the servo patterns 25p while the thin hard magnetic layer 31 serves as the magnetic recording layer 23.

There are ion milling, sputtering etching, chemical etching, etc. as the etching method, but it would be preferable to use the physical etching (PVD) method such as ion milling.

Figure 12C:
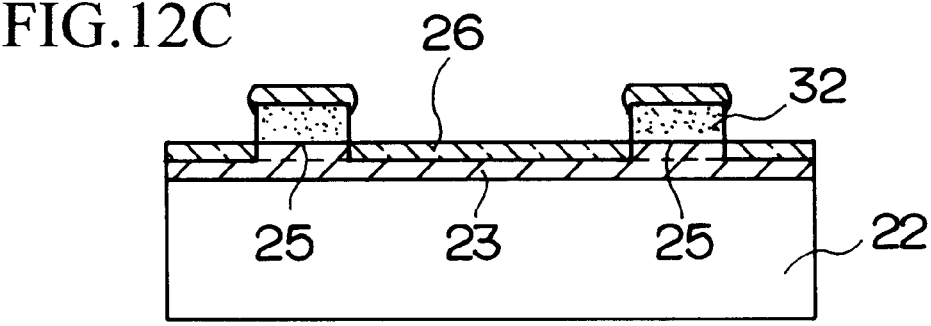

Next, as shown in FIG. 12C, the nonmagnetic layer 26 made of Cr is formed by sputtering on the entirety of the resultant structure to have a thickness of 5 to 100 nm. Then, the resist 32 is removed by solvent to thus leave the nonmagnetic layer 26 in only the regions not covered by the resist 32. The nonmagnetic layer 26 is buried around the patterned servo layers 25.

If flashes of the nonmagnetic layer 26 remain on peripheries of the servo layers 25 after the resist 32 is removed, it is necessary to remove the flashes by mechanical polishing, ion milling, sputtering, or the like and also planalize respective surfaces of the servo layers 25 and the nonmagnetic layer 26.

Figure 12D:
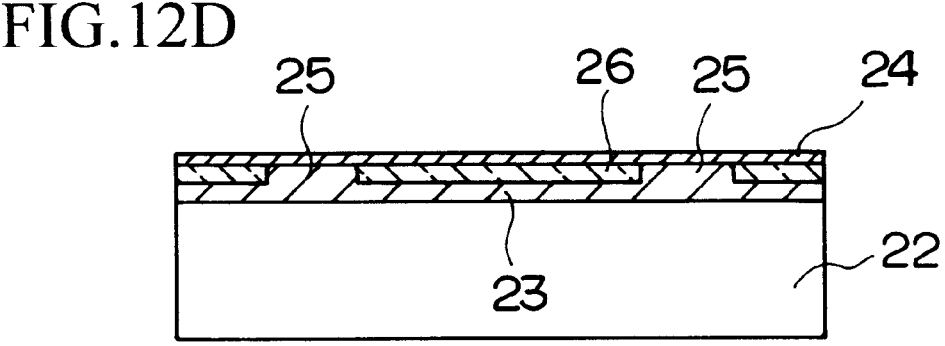

After such planalization process, as shown in FIG. 12D, the protection film 24 is formed on the servo layers 25 and the nonmagnetic layer 26. Thus, the magnetic recording substance with the structure shown in FIG. 11 has been finished.

SECOND EXAMPLE

Figure 13A:
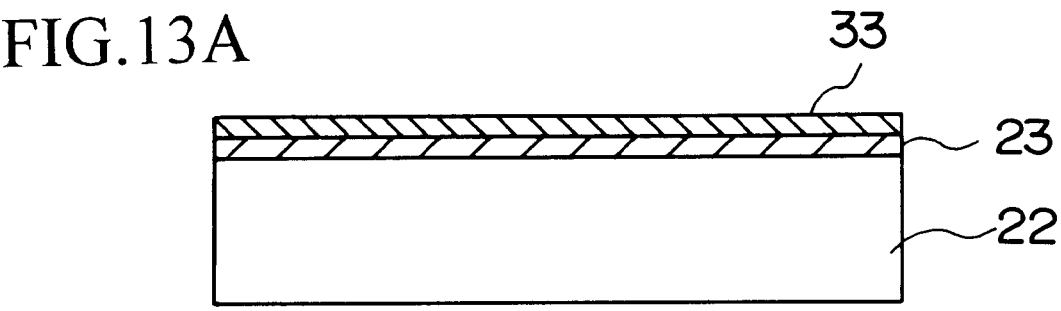
FIGS. 13A to 13D are sectional views illustrating a second method of manufacturing the magnetic recording medium according to the third embodiment of the present invention.

First, as shown in FIG. 13A, the magnetic recording layer 23 made of CrCoPt and a hard magnetic layer 33 made of CrCoPt are formed by sputtering on the substrate so as to have thicknesses of 5 to 100 nm and 5 to 250 nm respectively.

Figure 13B:
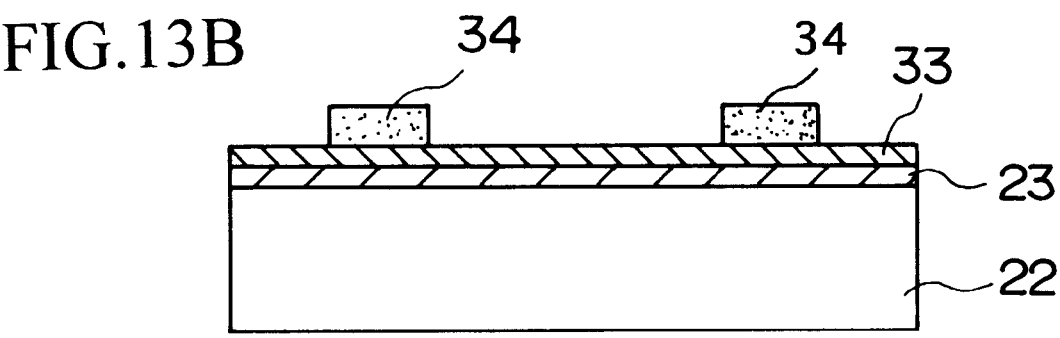

Next, as shown in FIG. 13B, a resist 34 is coated, and then the magnetic recording layer 23 is exposed within the regions excepting the tracking pattern forming regions by exposing and developing the resist 34.

Figure 13C:
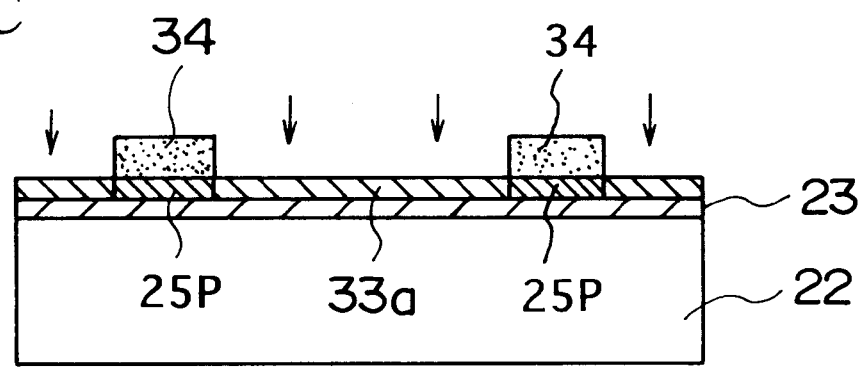

After this, as shown in FIG. 13C, chromium (Cr) is ion-implanted into the hard magnetic layer 33 located in regions not covered by the resist 34, so that the ion implanted regions are changed into nonmagnetic layers 33a. In this event, a depth of ion implantation can be controlled by adjusting ion acceleration energy. With the above, the servo patterns 25p are composed of the hard magnetic layer 33 and the magnetic recording layer 23 underlying the resist 34.

Since unevenness of the hard magnetic layer 33 due to ion implantation does not occur, planalization process is omissible.

Figure 13D:
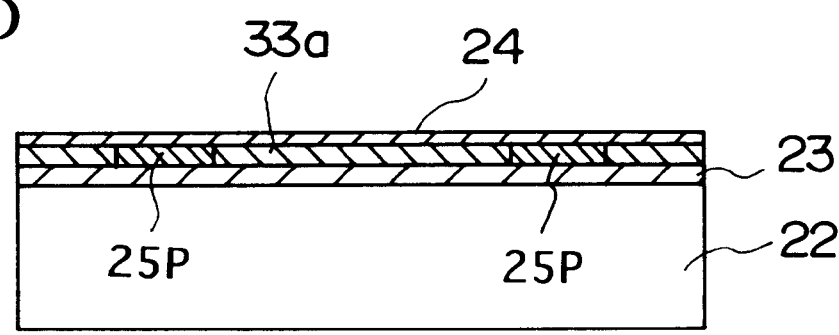

Then, after peeling off the resist 34 by solvent, as shown in FIG. 13D, the protection film 24 covering the servo patterns 25p and the nonmagnetic layers 33a is formed, thereby completing the magnetic recording medium.

In the third Embodiment, it would be understood that the nonmagnetic layer may be formed on the surface of the substrate.

Fourth Embodiment

Figure 14A:
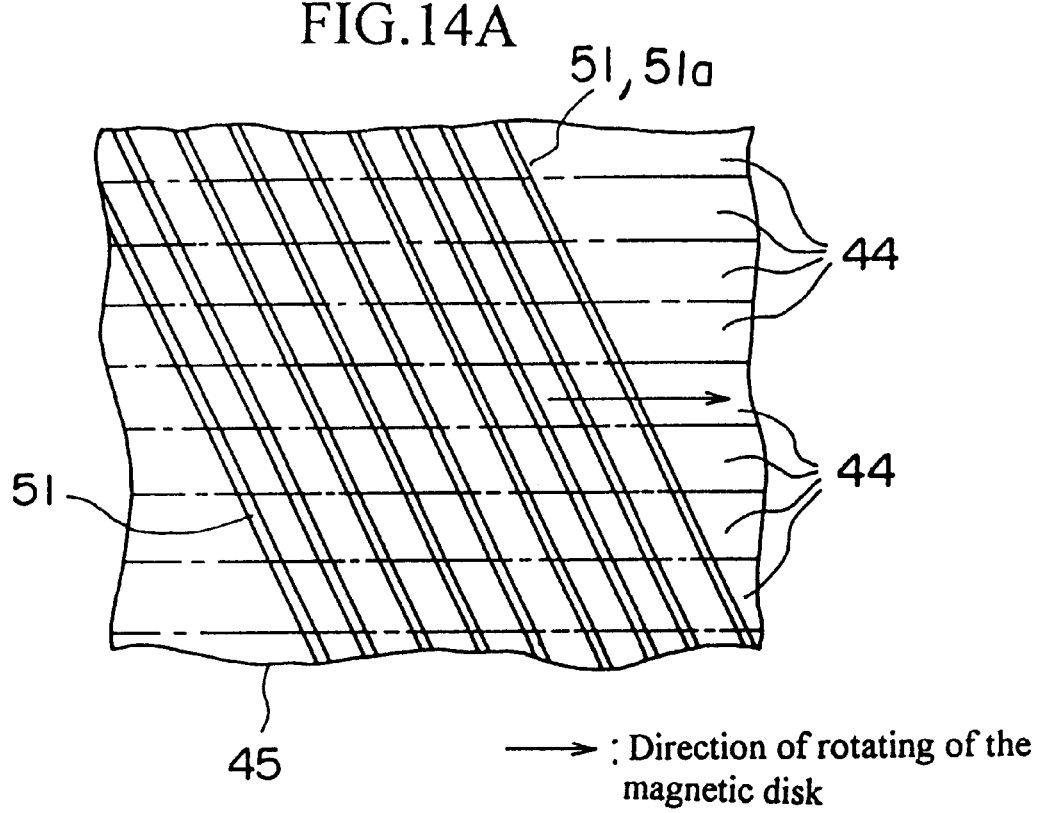
FIG. 14A is a plan view showing an example of servo patterns of the magnetic disk according to a fourth embodiment of the present invention.
Figure 14B:
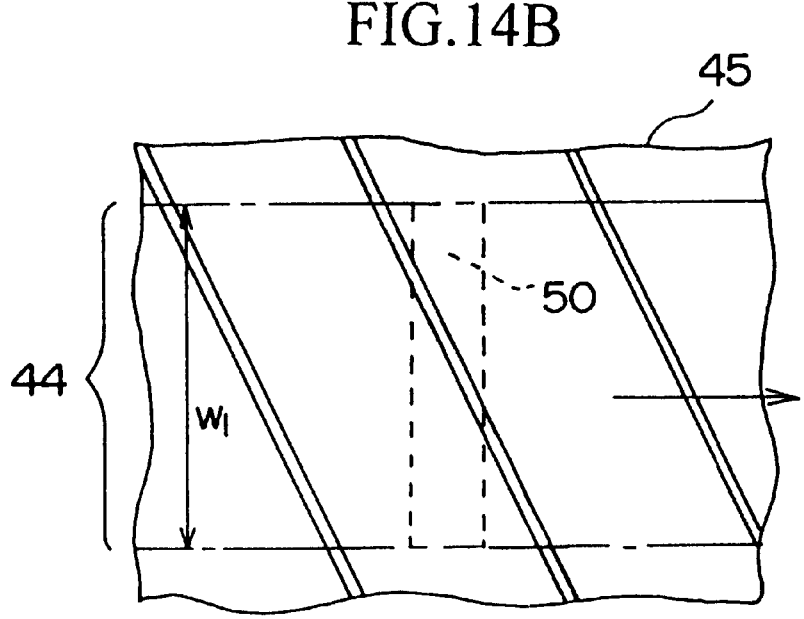
FIG. 14B is an enlarged fragmental plan view of the example in FIG. 14A.

In the servo regions 45 of the magnetic disk 42 shown in FIG. 2, linear servo patterns 51 which are inclined at a predetermined angle with the tangential direction of the tracks 44, as shown in FIG. 14A, are formed over a plurality of tracks 44. The servo patterns 51 are formed at a distance in the peripheral direction in plural numbers. As shown in FIG. 14B, a width W1 of the track 44 is substantially identical to a magnetic pole width of the recording head in the magnetic head 50 or a sense width of the reproducing head in the magnetic head 50.

Figure 15:
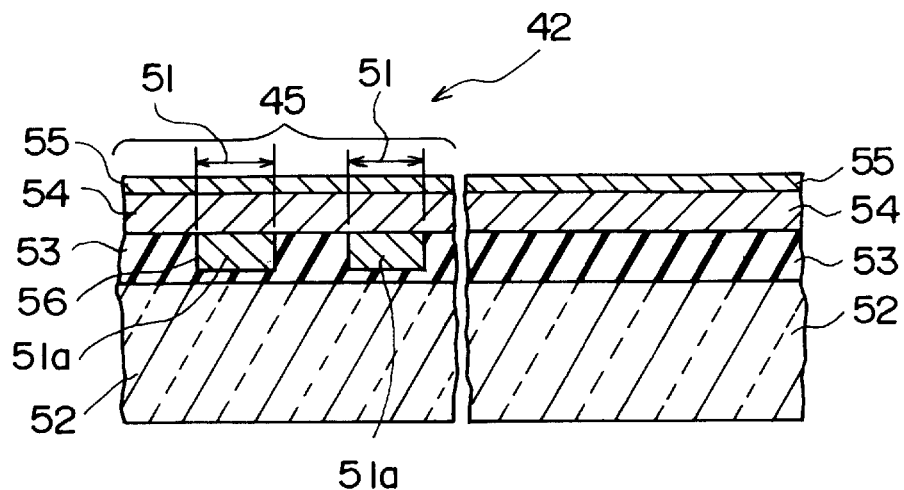
FIG. 15 is a sectional view showing a configuration of the magnetic disk according to the fourth embodiment of the present invention.

The magnetic disk 42 having the servo patterns 51 thereon has a sectional structure shown in FIG. 15.

The magnetic disk 42 shown in FIG. 15 comprises a non-magnetic substrate 52 made of glass wafer, silicon wafer, aluminum wafer covered with NiP, or the like; an underlying layer 53 made of non-magnetic material such as Cr or SiO2 on the substrate 52; a magnetic recording layer 54 made of hard magnetic material such as CoCrTa, CoCrPt, or CoCr on the underlying layer 53; and a protection layer 55 covering a magnetic recording layer 54. In respect of thickness of these layers 53 to 55, merely by way of example, the underlying layer 53 is 50 nm, the magnetic recording layer 54 is 20 nm, and the protection layer 55 is 15 nm. Provided that such configuration is employed wherein the underlying layer 53 is omitted, the surface of the substrate 52 serves as the underlying surface for the magnetic recording layer 54.

On the underlying layer 53 which exists in the servo region 45, grooves 56 in which a part of the servo patterns 51 are to be buried are formed. A hard magnetic layer 51a such as CoCrTa, CoCrPt, or CoCr is buried in the grooves 56. Each servo pattern 51 is virtually made up of the hard magnetic layer 51a buried in one groove 56 and the magnetic recording layer 54 formed on the hard magnetic layer 51a. In the servo region 45, since servo information are written into the hard magnetic layer 51a and the magnetic recording layer 54 formed on the groove 56, data other than servo information cannot be recorded on the magnetic recording layer 54. The hard magnetic layer 51a may be formed of material similar to or different from the magnetic material constituting the magnetic recording layer 54.

In the case that the underlying layer 53 should be omitted, the grooves 56 are formed on the substrate 52 and then the hard magnetic layer 51a is buried in the grooves 56.

In turn, a way of writing servo information into the servo patterns 51 will be explained hereinbelow.

Figure 16A:
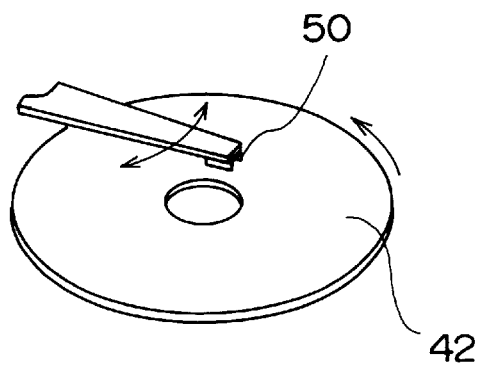
FIG. 16A is a perspective view showing an example wherein servo information are written into the magnetic disk according to the fourth embodiment of the present invention with a magnetic head.
Figure 16B:
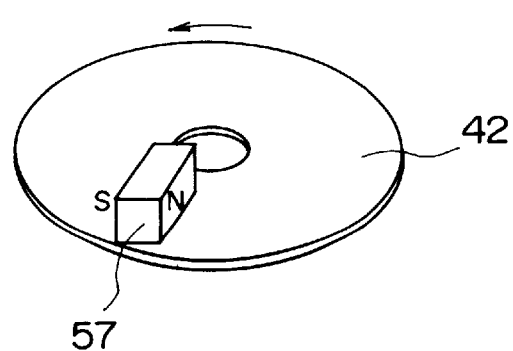
FIG. 16B is a perspective view showing an example wherein servo information are written into the magnetic disk according to the fourth embodiment of the present invention with a permanent magnet.

Writing of servo information is executed the use of a magnetic head shown in FIG. 16A or a permanent magnet shown in FIG. 16B.

As shown in FIG. 16A, in is the case in which case servo information are written by using the magnetic head 50, DC magnetic field is generated by the magnetic head 50 while rotating the circular disk type magnetic disk 42, and then desired servo patterns 51 and their peripheral magnetic recording layer 54 are magnetized by the DC magnetic field in the same circumferential direction.

Similarly, FIG. 16B shows a case in which servo data is written using a permanent magnet. As shown, S and N poles of the permanent magnet 57 are aligned in the circumferential direction and the magnetic disk 42 is then rotated in this state to magnetize desired servo patterns 51 in the same direction.

It is similarly applicable to every writing way of servo information that all servo patterns 51 are to be magnetized in the same circumferential direction. The magnetic recording layer 54 located within regions other than the servo regions 45 is magnetized concurrently in writing servo information, nevertheless no problem occurs in particular since magnetization direction can be changed by writing data.

Figure 17:
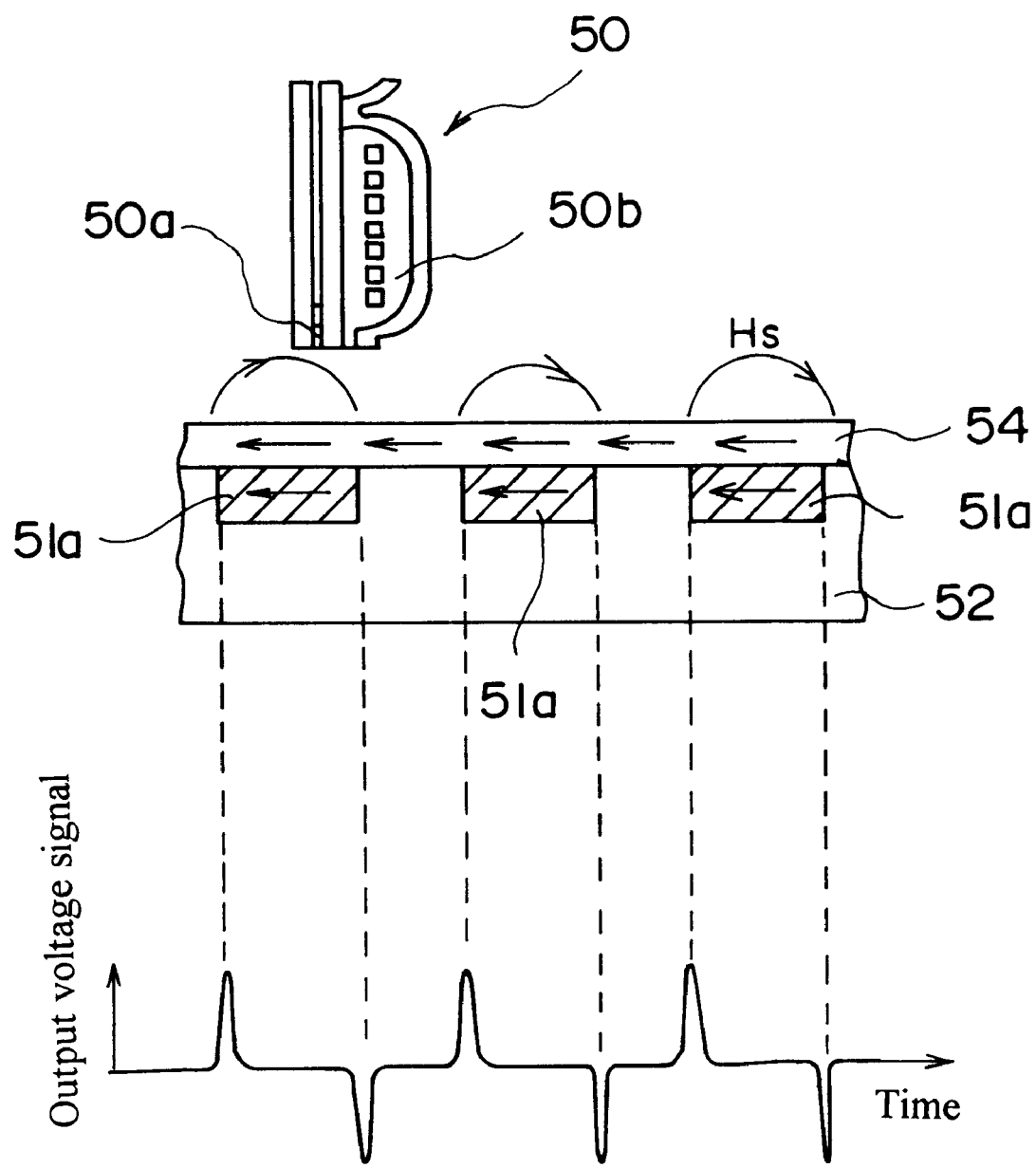
FIG. 17 is a sectional view showing a mechanism where servo information are read from the magnetic disk according to the fourth embodiment of the present invention and a waveform chart showing output waveforms from the magnetic head.

As shown in FIG. 17, servo information written as above can be read by a magnetoresistive device (reproducing head) 50a or an inductive device 50b. Hence, as shown in FIG. 17, magnetic fields Hs across both ends of the servo patterns 51 can be converted into voltage waveforms.

In this event, as shown in FIG. 14B, in respective tracks 44, the position of the reproducing head 50a is shifted by predetermined pitches respectively in the track length direction and the track width direction. In other words, linear servo patterns 51 which are arranged to cross obliquely with a plurality of tracks 44 are equivalent to the case where the number of split of the servo patterns 30 shown in FIG. 1A would be increased to reach the limit.

Figure 18:
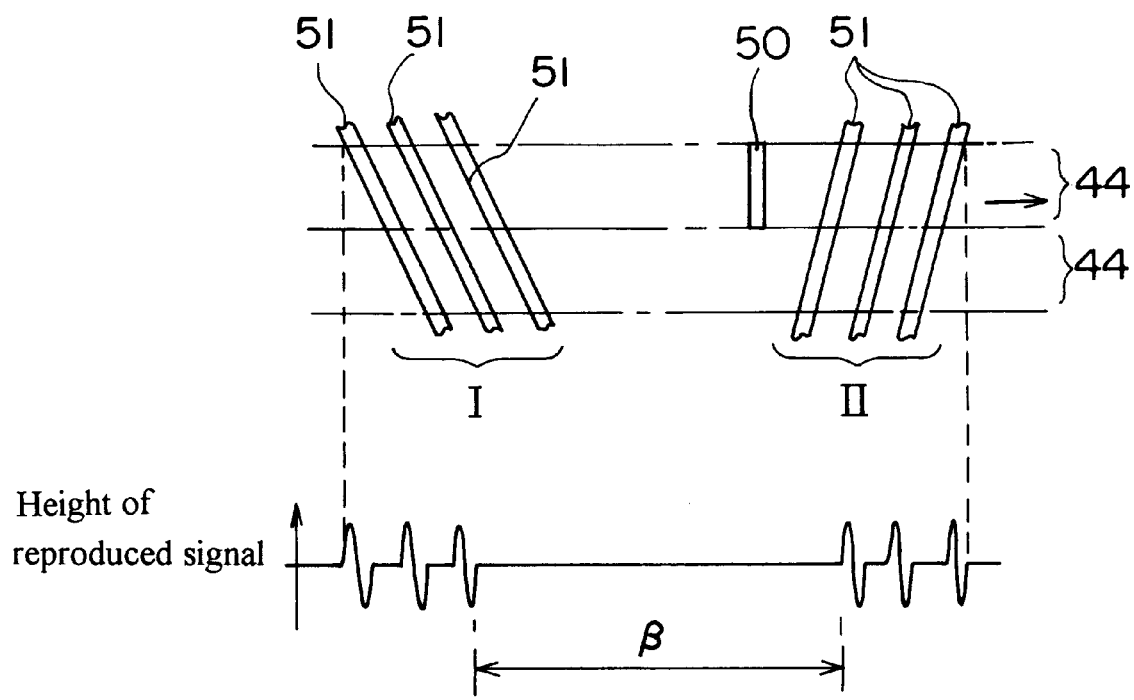
FIG. 18 is a plan view showing servo patterns to illustrate phase servo of the magnetic disk according to the fourth embodiment of the present invention and a waveform chart showing output waveforms from the magnetic head.

In the magnetic disk 42 in the phase servo system, as shown in FIG. 18, since a first group I and a second group II of the servo patterns 51 are formed symmetrically in the circumferential direction, a tracking control circuit 10a can detect tracking information according to change in phase (interval) β of the servo signal between these groups I and II.

Figure 19:
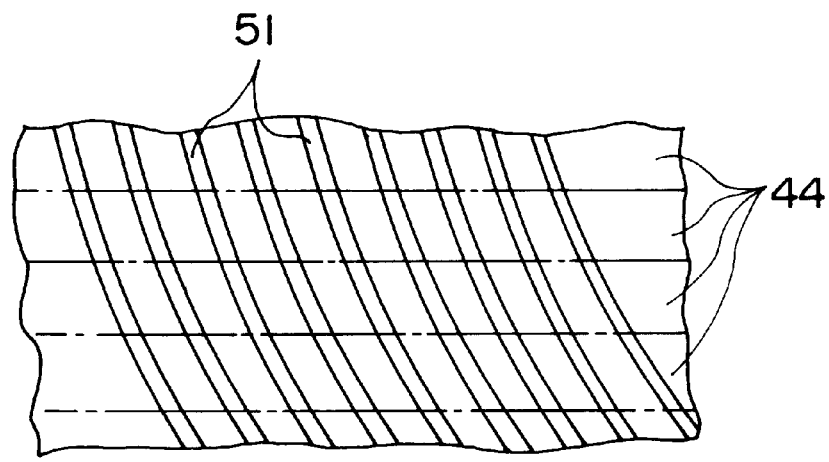
FIG. 19 is a plan view showing another example of servo patterns of the magnetic disk according to the fourth embodiment of the present invention.

The foregoing servo patterns 51 are not limited to the linear patterns, but as shown in FIG. 19 they may be formed as curved patterns crossing over a plurality of tracks 44. This is because, if the magnetic head 50 is swung between the inner periphery and the outer periphery of the magnetic disk 42, change in yaw angle can be reduced smaller when the servo patterns 51 take such curved patterns.

The linear or curved servo patterns 51 mentioned above are present as physical shape patterns to correspond to change in film thickness.

Therefore, according to such servo patterns 51, such process of writing the servo patterns 51 at a distance one by one by means of the magnetic head with good precision can be neglected, so that writing time can be shortened. Still further, since density of the servo patterns 51 is determined in accordance with change in the film thickness only, there is no need to consider leakage of the magnetic field or recording bleeding upon writing the servo information. Therefore, the servo patterns can be achieved with high precision and as a result the precision of detecting position can be improved.

Figure 1A:
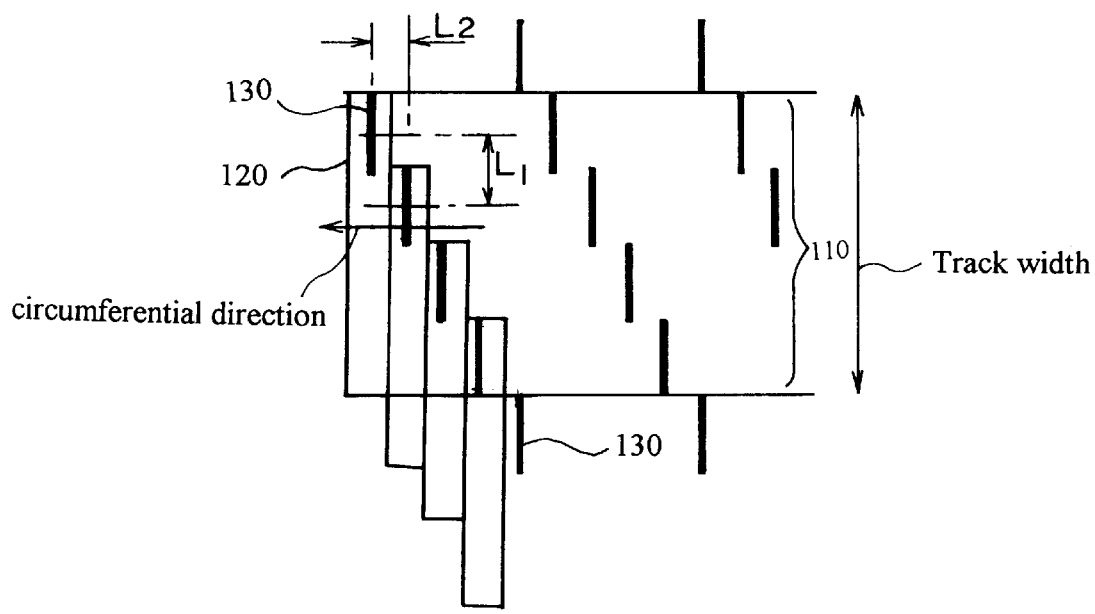
FIG. 1A is a plan view showing ideal servo patterns which are written one by one with a magnetic head in the prior art.
Figure 1B:
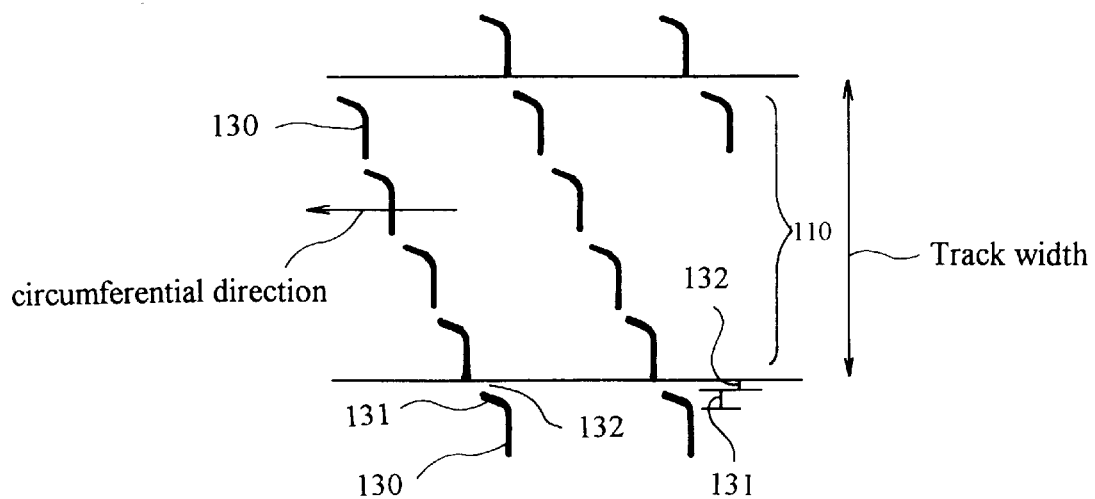
FIG. 1B is a plan view servo patterns which are actually written in the prior art.

In addition, since the linear or curved servo patterns 51 are formed to cross over a plurality of tracks 44 obliquely, omission of the pattern becomes hard to occur in contrast to the case where planar shapes of the servo patterns shown in FIG. 1A are employed. As a result, manufacturing yield can be improved.

Next, a way of forming the servo patterns 51 of the above magnetic disk 42 (magnetic recording medium) will be explained hereinbelow.

In servo pattern forming steps described later, though the procedure of forming resist patterns comprises two steps of exposing and developing the resist, a method illustrated in FIG. 20A or FIG. 21A will be adopted to expose the resist.

Figure 20A:
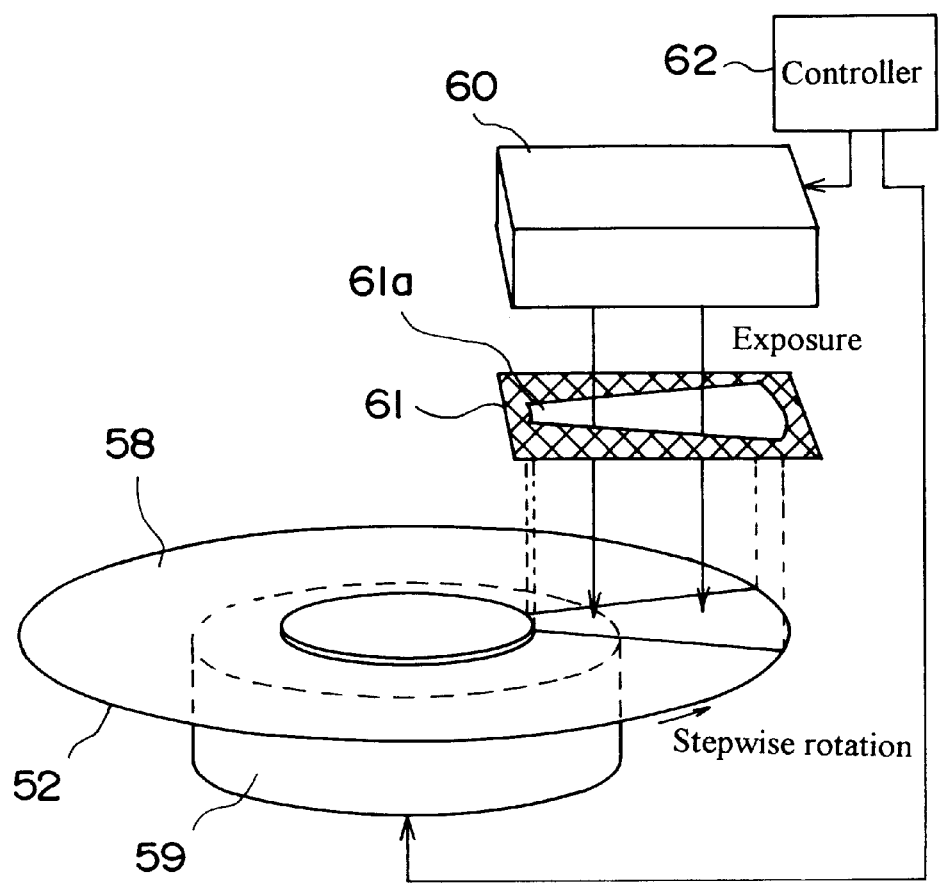
FIG. 20A is a perspective view showing a first example of a resist exposure method upon forming servo patterns of the magnetic disk according to the fourth embodiment of the present invention.
Figure 21A:
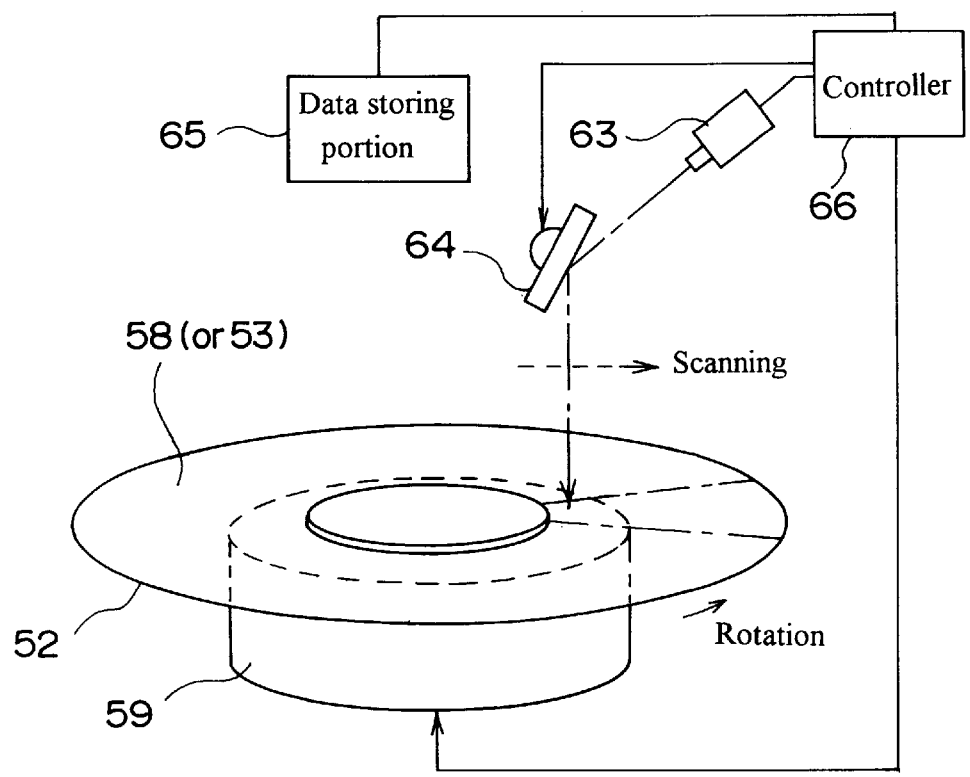
FIG. 21A is a perspective view showing a second example of a resist exposure method upon forming servo patterns of the magnetic disk according to the fourth embodiment of the present invention.

FIGS. 20A and 21A illustrate how to fit the circular disk type substrate 52, on which the resist 58 is coated, to the rotation shaft of the step motor 59 and then expose the resist 58 in this state respectively.

Figure 20B:
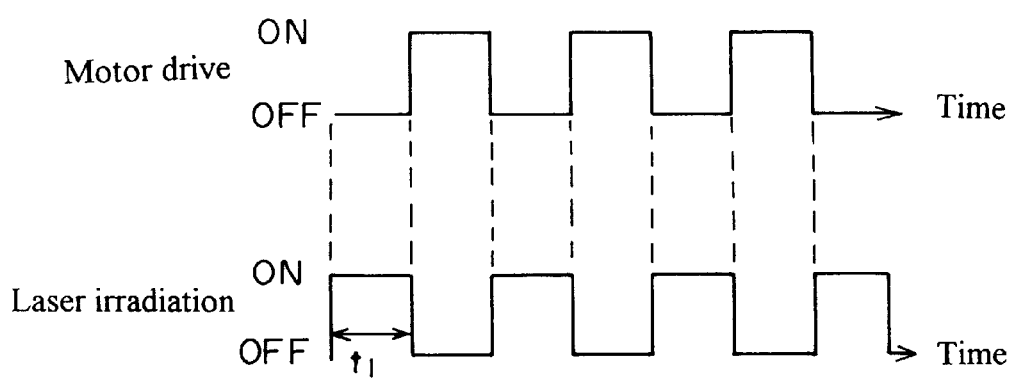
FIG. 20B is a timing chart illustrating timings for step motor drive and laser beam irradiation.

FIG. 20A shows an exposure method using a luminaire 60 and an exposure mask 61. It is not preferable to form the exposure mask 61 so as to correspond to the magnetic disk 42 one by one in size since the exposure equipment is increased in volume as a whole and alignment becomes more difficult. In the meanwhile the servo patterns 51 to be formed on the magnetic disk 42 are arranged repetitiously in the circumferential direction. Therefore, the exposure mask 61 having a size of exposure pattern regions 61a which are able to divide the magnetic disk 42 into n (where n is natural number) equal areas in the circumferential direction should be prepared. Subsequently, the exposure mask 61 is positioned over the substrate 52. In turn, patterns of the exposure mask 61 are transferred onto the resist 58 by lighting the luminaire 60 positioned over the exposure mask 61 for a predetermined time t1, and then a rotation portion of the step motor 59 is rotated by 360/n degree. After such operations are repeated n times, exposure of the whole surface of the resist 58 can be completed. Irradiation of the luminaire 60 and drive of the step motor 59 can be controlled at timings shown in FIG. 20B by the controller 62.

Alignment and focusing of the exposure mask 61 may be carried out either every time when the step motor 59 is stopped or only once before the exposure is commenced.

On the contrary, a laser light source 63 and a laser scanning system mirror 64 are provided in FIG. 21A. Based on data supplied from a pattern data storing portion 65, a controller 66 causes the laser light source 63 to turn on and off and causes the laser scanning system mirror 64 to swing, thereby scanning the substrate 52 with the laser beam in the radial direction.

Figure 21B:
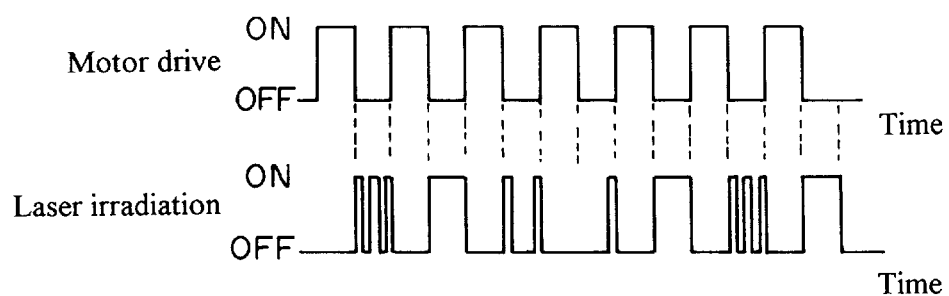
FIGS. 21B and 21C are timing charts illustrating timings for laser beam irradiation and step motor drive respectively.

As shown in FIG. 21B, for example, after one scanning of the laser beam in the radial direction has been finished, such operations have been repeated that the controller 66 causes the step motor 59 to rotate by predetermined steps and then causes the laser light source 63 to expose the resist 58 in the radial direction. When the rotation portion of the step motor 59 has been rotated up to 360 degree, exposure process of the entire surface of the resist 58 has been completed.

Figure 21C:
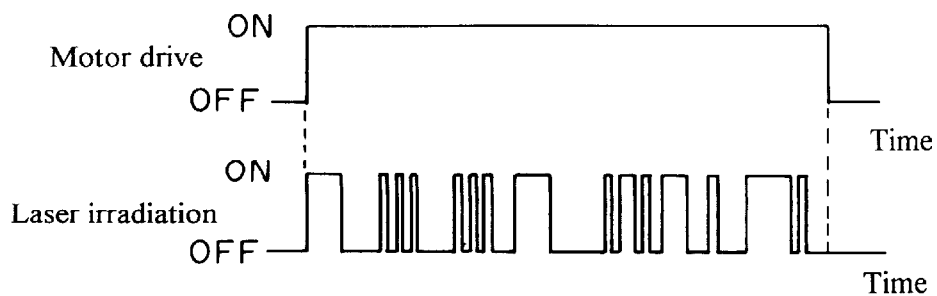

Alternatively, exposure using the laser beam may be effected every circumferential direction. In this case, as shown in FIG. 21C, the step motor 59 is driven continuously at a predetermined rotational speed and at the same time the laser beam irradiation is turned on and off in coincidence with pattern profiles.

By making use of the above exposure method, a method of manufacturing the magnetic disk 42 having the sectional structure shown in FIG. 15 will be explained hereinbelow.

Figure 22A:
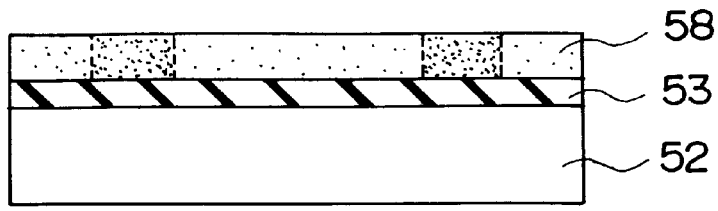
FIGS. 22A to 22E are sectional views showing first steps for manufacturing the fourth magnetic disk according to the embodiment of the present invention.
Figure 22B:
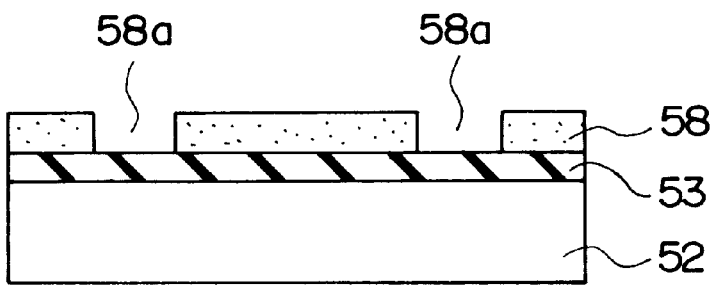

To begin with, as shown in FIG. 22A, an underlying layer 53 is formed on a substrate 52 and then a resist 58 is deposited on the underlying layer 53. Subsequently, latent images of the servo patterns are formed by exposing the resist 58 in terms of the exposure method shown in FIG. 20 or FIG. 21. Thereafter, as shown in FIG. 22B, openings 58a are formed by developing the resist 58 in respective regions in which the servo patterns 51 are to be formed.

Figure 22C:
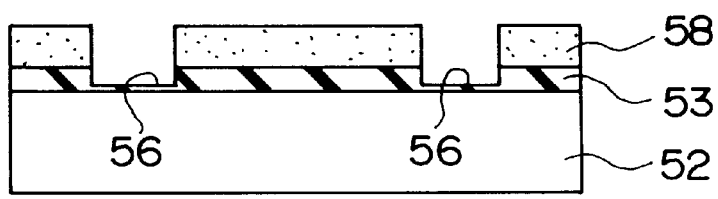

Next, as shown in FIG. 22C, the underlying layer 53 exposed from the openings 58a of the resist 58 is etched to form the grooves 56. A depth of the groove 56 may be such as to not expose the substrate 52, as shown in FIG. 22C, or else it may be formed to the extent that the substrate is exposed. As the etching method, there are ion milling, sputter etching, chemical etching, and so forth. Provided that silicon is used as constituting material of the substrate 52, reactive ion etching is applicable.

Figure 22D:
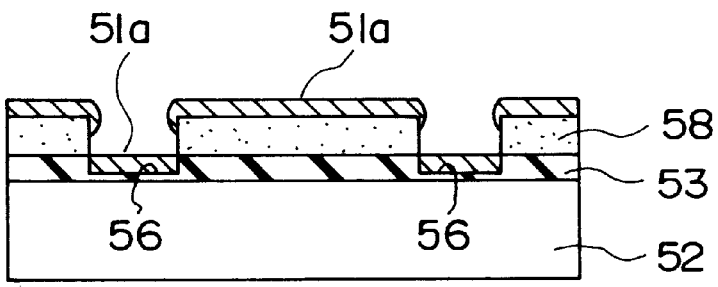

Still further, as shown in FIG. 22D, a hard magnetic layer 51a is formed on the entirety by sputtering so as to bury the grooves 56 and then, if the resist 58 is removed in virtue of solvent, the hard magnetic layer 51a remains only in the grooves 56.

In the next, the underlying layer 53 and the hard magnetic layer 51a are planarized by means of mechanical polishing, ion milling, or the like. Since the surface opposing to the magnetic head 50 is made flat by this planarization, there is no possibility that the magnetic head 50 running over the surface of the magnetic disk 42 is destroyed by projections.

Figure 22E:
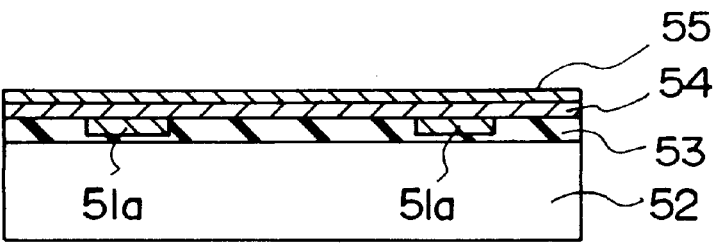

After such planarization process, as shown in FIG. 22E, when the magnetic recording layer 54 is formed on the hard magnetic layer 51a and the underlying layer 53 by sputtering to have a thickness of 5 to 100 nm and then a protection film 55 is formed on the magnetic recording layer 54, the magnetic disk 42 having the sectional structure shown in FIG. 15 has been finished.

Incidentally, lubricant may be coated on the protection layer 55.

Fifth Embodiment

Although in the first embodiment the magnetic recording layer 54 has been formed on the hard magnetic layer 56a as the servo patterns 51, they can be formed so as to put upsidedown. Therefore, another embodiment will be explained hereinbelow.

Figure 23:
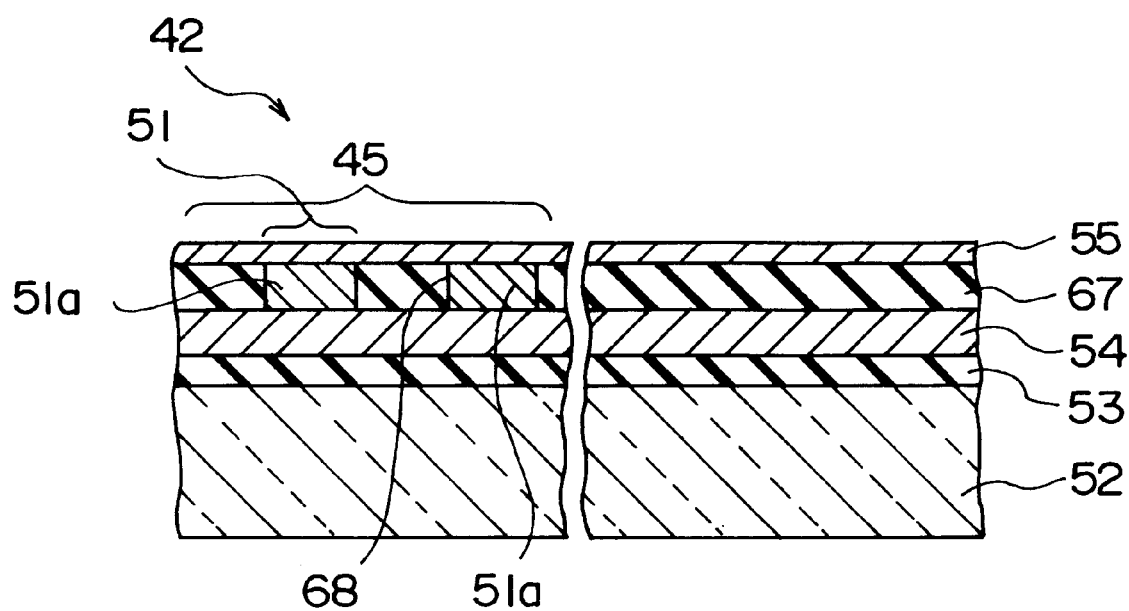
FIG. 23 is a sectional view showing a second example of a configuration of the magnetic disk according to a fifth embodiment of the present invention.

FIG. 23 is a fragmentary sectional view showing a magnetic disk (magnetic recording medium) according to a fifth embodiment of the present invention. Since planar shapes and arrangements of the patterns of the hard magnetic layer 51a constituting the servo patterns 51 are similar to those have already been explained in the first embodiment, their description is omitted.

In FIG. 23, the magnetic disk 42 comprises a nonmagnetic substrate 52 made of glass wafer, silicon wafer, aluminum wafer covered with NiP film, or the like; an underlying layer 53 made of non-magnetic material such as Cr or SiO2 on the substrate 52; a magnetic recording layer 54 made of CoCr, CoCrPt, CoCrTa, CoNiCr, or the like on the underlying layer 53; a non-magnetic intermediate layer 67 for covering the magnetic recording layer 54; a hard magnetic layer 51a made of CoCr, CoCrPt, CoCrTa, CoNiCr, or the like, buried in the intermediate layer 67 in the servo regions 45; and a protection layer 55 for covering the hard magnetic layer 51a and the intermediate layer 67.

In the intermediate layer 67, planar shapes of the grooves 68 to bury the hard magnetic layers 51a therein is the same as those of the servo patterns 51 explained in the first embodiment. The hard magnetic layers 51a in the grooves 68 come into contact with the magnetic recording layer 54 at the bottom of the grooves 68. The servo patterns 51 are composed of the hard magnetic layers 51a in the grooves 68 and the magnetic recording layer 54 directly below the hard magnetic layers 51a.

In such servo patterns 51, a way of writing servo information is similar to that explained in the first embodiment. Servo information written into the servo patterns 51 can be read by the magnetic head 50.

Since the non-magnetic intermediate layer 67 is buried around the servo patterns 51, a distance between the servo patterns 51 and the magnetic head 50 can be obtained as a total magnitude of a flying height of the magnetic head 50 and a film thickness of the protection layer 55. As a result, the servo magnetic field input into the magnetic head 50 can be enhanced to thus ensure reading of tracking information.

In the fifth embodiment, in a similar manner to that shown in FIG. 14A or FIG. 19, linear or curved servo patterns 51 are formed to cross over a plurality of tracks 44 in the oblique direction and the patterns are then formed according to change in film thickness in the circumferential direction.

Hence, according to such servo patterns 51, like the first embodiment, a writing time can be shortened and high precision patterns can be achieved,.

Still further, since the linear or curved servo patterns 51 are formed to cross over a plurality of tracks 44 at oblique angles, mechanical strength of such patterns is enhanced in comparison with isolated patterns so that defects of the patterns are hard to occur.

In the fifth embodiment, similarly to that shown in FIG. 14, no data except for servo data is recorded in the magnetic recording layer 54 in the servo regions 45.

Next, a method of forming the servo patterns 51 having the structure shown in FIG. 23 will be explained hereinbelow.

Figure 24A:
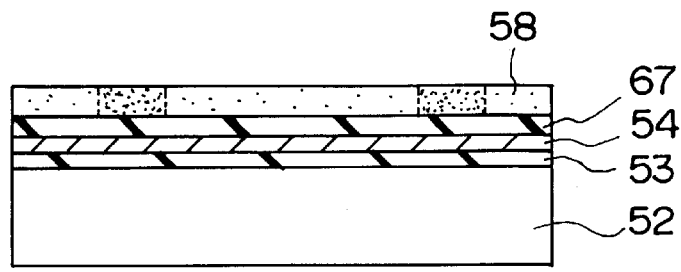
FIGS. 24A to 24E are sectional views showing second steps for manufacturing a fifth magnetic disk according to the embodiment of the present invention.

First, as shown in FIG. 24A, the 50 nm thick underlying layer 53 made of Cr is formed on the substrate 52, then the magnetic recording layer 54 made of CoCrPt is formed to have a 20 nm thickness, for example, and then the intermediate layer 67 made of SiO2 is formed to have a thickness of 5 to 20 nm. These layers 53, 54, 67 are formed by sputtering. Subsequently, the resist 58 is coated on the intermediate layer 67 and then latent images of the servo patterns are formed on the resist 58 by exposing the resist 58 by virtue of the exposure method shown in FIG. 20A or FIG. 21A.

Figure 24B:
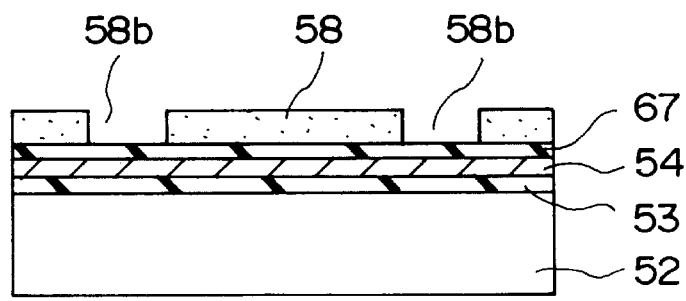

Next, as shown in FIG. 24B, the resist 58 is patterned by developing the resist 58 to form the openings 58b in respective regions in which the servo patterns are to be formed.

Figure 24C:
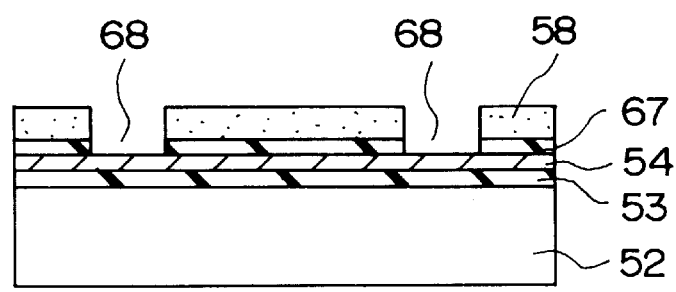

Thereafter, as shown in FIG. 24C, the grooves 68 are formed by removing the intermediate layers 67 which are not covered with the resist 58 by means of etching. As the etching method, ion milling, sputter etching, chemical etching, etc. may be considered.

Figure 24D:
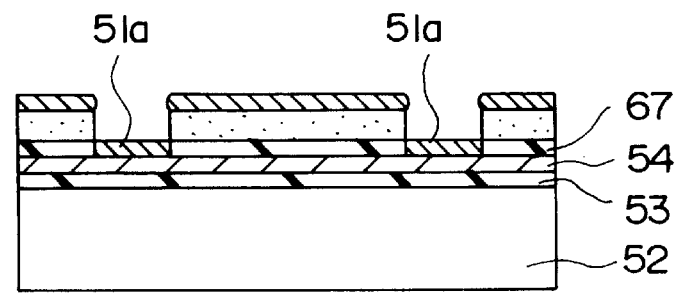

Then, as shown in FIG. 24D, the 5 to 20 nm thick hard magnetic layer 51a made of CoCrPt is formed on the entirety by sputtering and succeedingly the hard magnetic layers 51a remain only in the grooves 68 by peeling off the resist 58 by solvent. The hard magnetic layer 51a and the intermediate layer 67 are planarized by means of polishing, or the like.

As a result, the servo patterns 51 are composed of the hard magnetic layers 51a and the magnetic recording layers 54 just beneath the hard magnetic layers 51a.

Figure 24E:
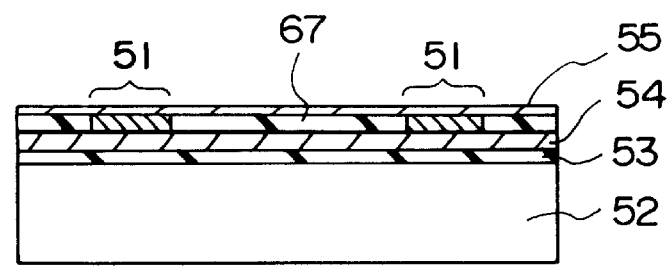

After such planarization process, when the protection film 55 is formed on the hard magnetic layers 51a and the intermediate layer 67, as shown in FIG. 24E, the magnetic disk having the configuration shown in FIG. 23 has been accomplished.

The underlying layer 53 is often omitted. Further, lubricant may be coated on the protection layer 55.

Sixth Embodiment

The above linear or curved servo patterns 51 may be formed by patterning a part of the magnetic recording layer 54.

Figure 25A:
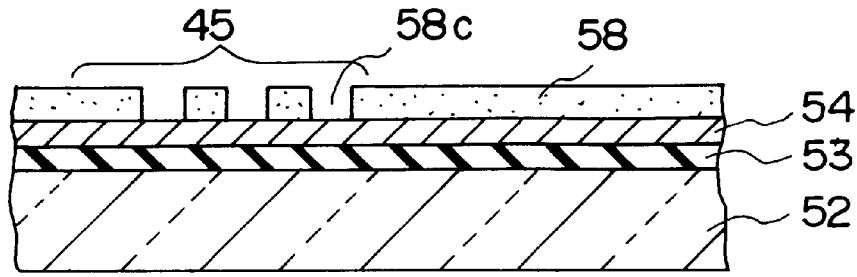
FIGS. 25A and 25B are sectional views showing steps for manufacturing a first example of a configuration of the magnetic disk according to a sixth embodiment of the present invention.

For instance, as shown in FIG. 25A, the underlying layer 53 and the magnetic recording layer 54 of about 20 nm thickness are formed on the substrate 52 in order and then the resist 58 is deposited on the magnetic recording layer 54. The resist 58 is then exposed and developed by using the method shown in FIG. 20A or FIG. 21A to pattern the resist 58. The resist 58 covers regions other than the servo regions 45. Openings 58c are formed around the servo patterns in the servo regions 45.

Subsequently, by removing the magnetic recording layer 54 not covered with the resist 58 by means of ion milling, sputter etching, chemical etching, or the like, the grooves 54a are formed and also the magnetic recording layer 54 other than the servo region 45 is left. The magnetic recording layer 54 remained in the servo region 51 may be used as the servo patterns 51.

Figure 25B:
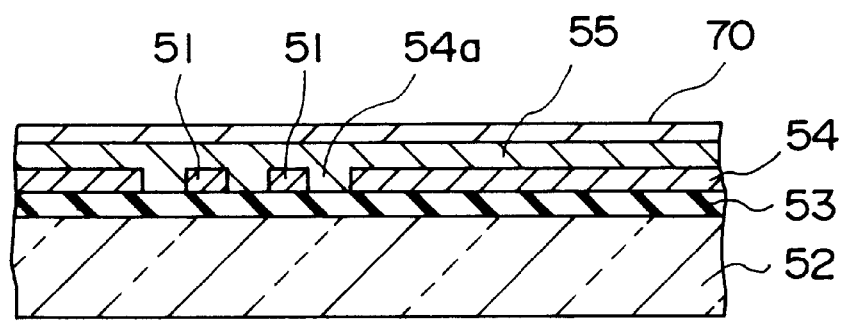

In turn, as shown in FIG. 25B, the magnetic recording layer 54 and the servo patterns 51 are covered with the protection film 55 and then the grooves formed around the servo patterns 51 are filled with the protection film 55. At that time, the protection film 55 may be planarized. Furthermore, when lubricant 70 is coated on the protection film 55, the magnetic disk can be finished.

If the servo patterns 51 are to be formed, such a step may be employed that the magnetic recording layer (hard magnetic layer) 54 is patterned by irradiating the laser beam with high energy to thus obtain servo pattern profiles. Irradiation of the laser beam and its timing are similar to those shown in FIGS. 21A to 21C.

Though the servo patterns 51 shown in FIG. 25B have been formed by patterning the magnetic recording layer 54 in the servo regions 45, a method of forming the servo patterns 51 without patterning of the magnetic recording layer 54 will be explained hereinbelow.

Figure 26A:
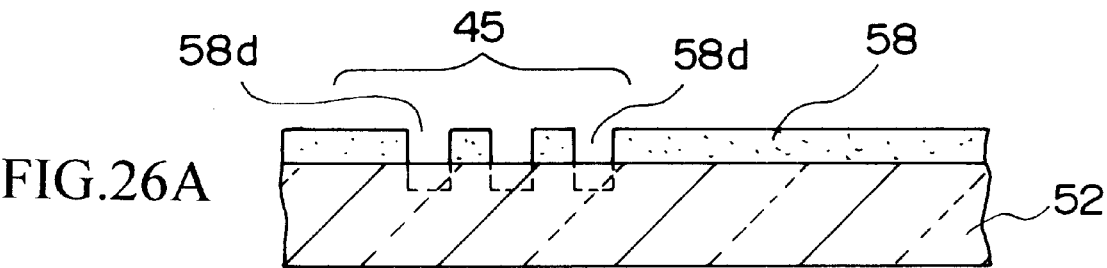
FIGS. 26A to 26C are sectional views showing steps for manufacturing a second example of a configuration of the magnetic disk according to the sixth embodiment of the present invention.

At first, as shown in FIG. 26A, the resist 58 is formed to cover regions other than the servo regions 45 and the servo pattern forming regions on the substrate 52. In other words, the resist 58 having windows 58d around the servo pattern forming regions in the servo regions 45 is formed. The windows 58d in the resist 58 are formed through the exposure process shown in FIG. 20 or FIG. 21. In turn, the grooves 72 are formed in the substrate 52 by etching the substrate 52 up to a depth of 20 nm, for example, using the resist 58 as a mask. As a result, the hard magnetic material 71 deposited in the grooves 72 within the servo regions 45 is formed far from the magnetic head 50.

Figure 26B:
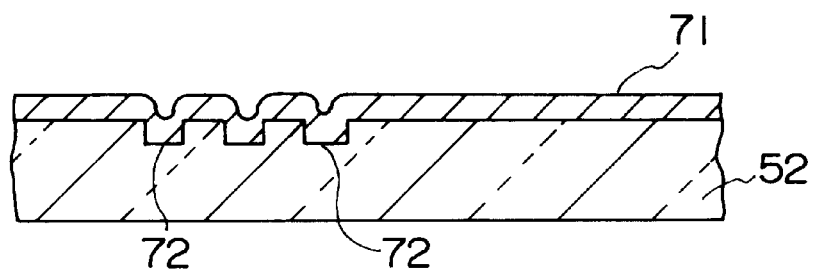

Next, as shown in FIG. 26B, after removing the resist 58 by using solvent, the hard magnetic material 71 is formed by sputtering to have a thickness of 20 nm, for example. Then, as shown in FIG. 26C, the protection film 55 is formed on the hard magnetic material 71 and lubricant 70 is then coated thereon.

Figure 26C:
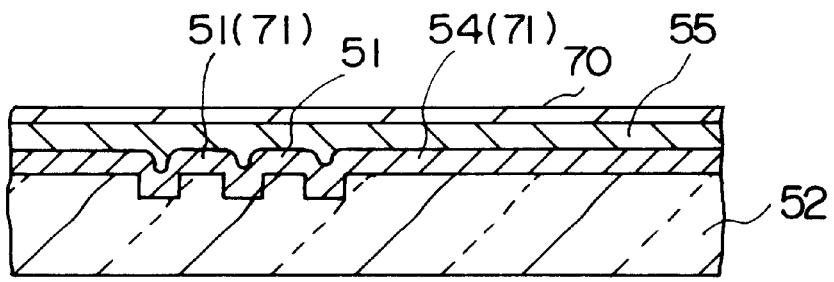

In the magnetic disk shown in FIG. 26C, provided that the large external magnetic field is applied to the hard magnetic material 71 in terms of the way shown in FIG. 16A or FIG. 16B, the hard magnetic materials 71 in the grooves 72 located far away are magnetized weaker than other regions and in addition they are remote from the reproducing magnetic head 50. As a result, the magnetic fields emitted from the grooves 72 can be extremely reduced. Consequently, in the servo regions 45, convex portions of the hard magnetic material 71 surrounded by the grooves 72 act as the servo patterns 51. Besides, the hard magnetic layers 71 located in the regions other than the servo regions 45 act as the magnetic recording layer 54.

Change of the magnetic field caused by the servo patterns 51 in the servo regions 45 of the magnetic disk, as shown in FIGS. 25B and 26C, and the servo detection signals are in essential similar to those shown in FIG. 17.

Incidentally, like the third and fourth embodiments, the servo patterns 51 shown in FIGS. 25B and 26C have linear or curved planar shapes. And, in the same manner as shown in FIG. 14A or FIG. 19, the servo patterns 51 are arranged so as to cross over a plurality of tracks 44 at an oblique angle.

What is claimed is:

1. A magnetic recording medium, comprising:

a magnetic recording layer having first and second surfaces and having a plurality of data signal recording regions and a plurality of servo signal recording regions demarcated so as to be alternately disposed in a circumferential direction;

a plurality of servo layers composed of a hard magnetic substance and formed directly on said second surface of said magnetic recording layer, said plurality of servo layers being discontinuously arranged in the circumferential direction in each of said plurality of servo signal recording regions; and a nonmagnetic substrate supporting the second surface of said magnetic recording layer.

2. The magnetic recording medium according to claim 1, wherein said nonmagnetic substrate has a plurality of concave portions in which said plurality of servo layers are buried.

3. The magnetic recording medium according to claim 1, wherein the first surface of aid magnetic recording layer is flattened.

4. The magnetic recording medium according to claim 1, wherein a thickness of each of said plurality of servo layers is at least 2.5 times greater than a thickness of said magnetic recording layer.

5. The magnetic recording medium according to claim 1, wherein said magnetic recording layer is made of a hard magnetic substance.

6. The magnetic recording medium according to claim 1, wherein said plurality of servo layers are made of at least one of CoCr, CoCrPt, CoCrTa, and CoNiCr.

7. The magnetic recording medium according to claim 1, further comprising a plurality of tracks set on said magnetic recording layer in a shape of concentric circles along said circumferential direction, and wherein said plurality of servo layers are disposed in said plurality of tracks, and individual ones of said servo layers are spaced from one another by a predetermined amount in said circumferential direction.

8. A magnetic recording medium, comprising:

a non-magnetic substrate;

a plurality of grooves defined in said substrate; and a magnetic recording layer having upper and lower faces, said lower face being formed on said substrate and filling said grooves, whereby said magnetic recording layer defines relatively thicker servo recording regions and relatively thinner data signal recording regions, said servo signal recording regions being demarcated so as to be alternately disposed in a circumferential direction;

wherein said grooves being defined at a predetermined oblique angle relative to the circumferential direction.

9. The magnetic recording medium according to claim 1, further comprising a non-magnetic underlying layer interposed between said substrate and said magnetic layer; and said grooves being defined in said underlying layer.

* * * * *

UNITED STATES PATENT AND TRADEMARK OFFICE
CERTIFICATE OF CORRECTION

PATENT NO. : 6,055,139
DATED : April 25, 2000
INVENTOR(S) : Ohtsuka, et. al.

It is certified that error appears in the above-identified patent and that said Letters Patent is hereby corrected as shown below:

On the Face of the Patent:

Under "[56] References Cited Foreign Patent Documents" please delete "59-27642 4/1984" and insert --59-72642 4/1984-- therefor In the Claims:

In claim 3, line 2, delete "aid" and insert --said-- therefor

Signed and Sealed this

Tenth Day of April, 2001

Attest:

NICHOLAS P. GODICI

Attesting Officer     Acting Director of the United States Patent and Trademark Office